(12) United States Patent
Makita et al.

(10) Patent No.: US 12,368,970 B2
(45) Date of Patent: Jul. 22, 2025

(54) VEHICULAR CAMERA, AND VIDEO OUTPUT METHOD

(71) Applicant: Panasonic Intellectual Property Management Co., Ltd., Osaka (JP)

(72) Inventors: Tetsuya Makita, Kanagawa (JP); Yasuyuki Goda, Kanagawa (JP); Gou Kaise, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/503,897

(22) Filed: Nov. 7, 2023

(65) Prior Publication Data
US 2024/0214695 A1   Jun. 27, 2024

(30) Foreign Application Priority Data
Dec. 22, 2022   (JP) ................. 2022-205941

(51) Int. Cl.
*H04N 23/88*   (2023.01)
*B60R 1/27*   (2022.01)
(Continued)

(52) U.S. Cl.
CPC ............. *H04N 23/88* (2023.01); *B60R 1/27* (2022.01); *H04N 7/183* (2013.01); *H04N 23/11* (2023.01); *H04N 23/71* (2023.01); *H04N 23/76* (2023.01); *H04N 23/81* (2023.01); *B60R 2300/105* (2013.01); *B60R 2300/20* (2013.01); *B60R 2300/30* (2013.01)

(58) Field of Classification Search
CPC ........ H04N 23/88; H04N 7/183; H04N 23/11; H04N 23/71; H04N 23/76; H04N 23/81; H04N 23/10; H04N 23/56; H04N 23/57; B60R 1/27; B60R 2300/105; B60R 2300/20; B60R 2300/30; B60R 1/30
See application file for complete search history.

(56) References Cited

U.S. PATENT DOCUMENTS

| 10,560,670 B2 * | 2/2020 | Sato ................. H04N 23/73 |
| 2010/0013615 A1 * | 1/2010 | Hebert ................. G06V 20/58 |
| | | 340/425.5 |

(Continued)

FOREIGN PATENT DOCUMENTS

WO   WO 2021166601 A1   8/2021

*Primary Examiner* — Michael Lee
(74) *Attorney, Agent, or Firm* — Seed IP Law Group LLP

(57) ABSTRACT

A vehicular camera is configured to image at least part of surroundings of a vehicle body irradiated by a near-infrared light source attached to the vehicle body, and output a first video imaged. The vehicular camera includes: an illuminance sensor is configured to detect an illuminance of the least part of the surroundings of the vehicle body; and an output circuit configured to output a second video in which at least part of the first video is subjected to a first correction processing, when the near-infrared light source has a first light emission intensity, and output a third video in which at least part of the first video is subjected to a second correction processing different from the first correction processing, when the near-infrared light source has a second light emission intensity larger than the first light emission intensity and the illuminance is smaller than a predetermined value.

16 Claims, 15 Drawing Sheets

(51) Int. Cl.
*H04N 7/18* (2006.01)
*H04N 23/11* (2023.01)
*H04N 23/71* (2023.01)
*H04N 23/76* (2023.01)
*H04N 23/81* (2023.01)

(56) References Cited

U.S. PATENT DOCUMENTS

| | | |
|---|---|---|
| 2018/0011194 A1* | 1/2018 | Masuda ................ H04N 23/73 |
| 2018/0146144 A1* | 5/2018 | Sugiyama .............. H04N 23/20 |
| 2019/0143908 A1* | 5/2019 | Koravadi .............. H04N 7/183 |
| | | 315/82 |
| 2021/0195108 A1* | 6/2021 | Wang ..................... H04N 23/73 |
| 2021/0223446 A1* | 7/2021 | Yamada ............... G02B 5/3083 |
| 2021/0314501 A1* | 10/2021 | Chen ...................... H04N 23/72 |
| 2023/0391250 A1* | 12/2023 | Hsu ........................ B60Q 1/249 |

* cited by examiner

| ILLUMI-NANCE [lux] | EXPOSURE VALUE | SIGNAL LEVEL |
|---|---|---|
| 10 | 30 ms | 100 |
| 100 | 30 ms | 1000 |
| 1000 | 10 ms | 3000 |

| LIGHT SOURCE TYPE | COLOR TEMPER-ATURE | B/G | R/G |
|---|---|---|---|
| VIS1 | 6500K | 0.5 | 0.6 |
| ... | ... | ... | ... |
| ... | ... | ... | ... |
| NIR | - | 1.1 | 1.1 |

T2

| LIGHT SOURCE TYPE | COLOR TEMPER-ATURE | CHROMA GAIN FOR WHOLE | CHROMA GAIN (DEPENDING ON HUE) | | | | |
|---|---|---|---|---|---|---|---|
| | | | 0° | 22.5° | 45° | 67.5° | ... |
| VIS1 | 6500K | 1.0 | 1.0 | 1.0 | 1.0 | 1.0 | ... |
| VIS2 | 4100K | 1.0 | 1.0 | 1.0 | 1.0 | 1.0 | ... |
| ... | ... | 1.0 | 1.0 | 1.0 | 1.0 | 1.0 | ... |
| NIR | - | 1.0 | 1.0 | 0 | 1.0 | 1.0 | ... |

VEHICULAR CAMERA, AND VIDEO OUTPUT METHOD

CROSS-REFERENCE TO RELATED APPLICATIONS

This application is based upon and claims the benefit of priority from Japanese Patent Application No. 2022-205941, filed on Dec. 22, 2022, the entire contents of which are incorporated herein by reference.

FIELD

The present disclosure relates to a vehicular camera, and a video output method.

BACKGROUND

Thus far, there has been known a vehicle in which an infrared light source (for example, a near-infrared light source) and a vehicular camera having sensitivity to infrared light (for example, near-infrared light) in addition to visible light are mounted in order to improve visibility of a low-illuminance region such as a lateral side of the vehicle particularly in nighttime conditions. A related technique is described in WO 2021-166601 A.

However, since the spectral distribution of the infrared light source and the spectral distribution of the visible light source are greatly different, it has been feared that appropriate white balance processing cannot be performed and unnecessary coloring may occur in the image, and a reduction in image quality, such as a reduction in color reproducibility, will be caused.

A problem to be solved by the present disclosure is to suppress a reduction in image quality in a vehicular camera having sensitivity to visible light and infrared light.

SUMMARY

A vehicular camera according to the present disclosure is capable of being mounted on a vehicle. The vehicle includes a first wheel, a second wheel, a vehicle body, and a near-infrared light source. The vehicle body is coupled to the first wheel and the second wheel and capable of moving by means of the first wheel and the second wheel. The near-infrared light source is attached to the vehicle body and configured to irradiate at least part of surroundings of the vehicle body with near-infrared light. The vehicular camera is configured to image the at least part of the surroundings of the vehicle body and be capable of outputting a first video imaged. The vehicular camera includes an illuminance sensor and an output circuit. The illuminance sensor is attached to the vehicle body and configured to be capable of detecting an illuminance of the at least part of the surroundings of the vehicle body. The output circuit is configured to be capable of performing outputting into inside the vehicle body. The output circuit is configured to output a second video in which at least part of the first video is subjected to a first correction processing, when the near-infrared light source has a first light emission intensity. The output circuit is configured to output a third video in which at least part of the first video is subjected to a second correction processing different from the first correction processing, when the near-infrared light source has a second light emission intensity larger than the first light emission intensity and the illuminance is smaller than a predetermined value.

DETAILED DESCRIPTION

Figure 1:
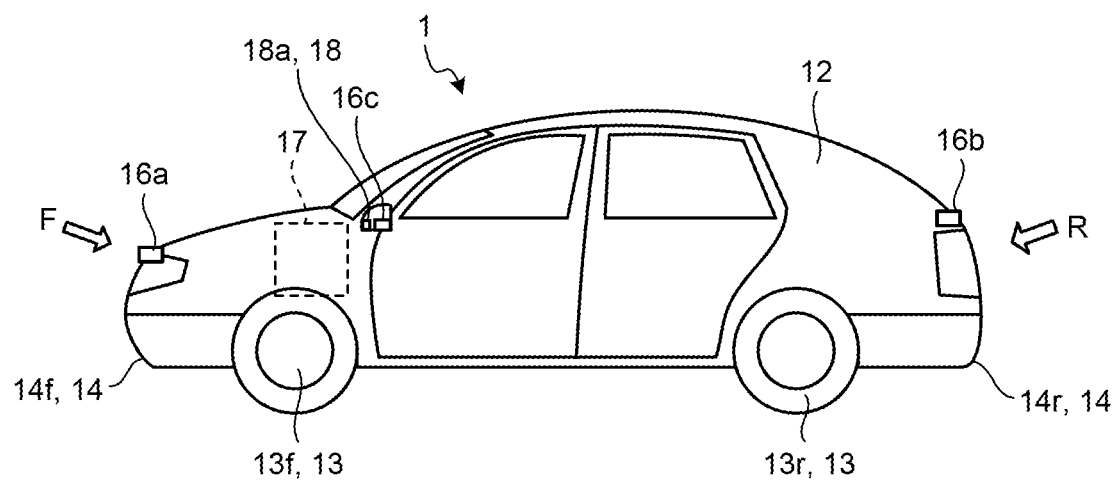
FIG. 1 is a diagram schematically illustrating an example of a vehicle according to an embodiment.

Hereinbelow, embodiments of a vehicle, a vehicular camera, a video output method, a program, and a recording medium according to the present disclosure are described with reference to the drawings.

In the following description, constituent elements having the same or substantially the same functions as those described earlier with respect to previously described drawings are denoted by the same reference numerals, and a repeated description is given only when necessary. Further, constituent elements having the same or substantially the same functions as those described earlier with respect to previously described drawings may be distinguished by adding a or b to the end of the reference numeral. Alternatively, when a plurality of constituent elements having the same or substantially the same functions are not distinguished, they may be unitedly described by omitting a or b added to the end of the reference numeral.

Thus far, a rearview camera in a rear portion and a side camera lateral to a sideview mirror have been mounted on a vehicle for visibility assistance to supplement the field of vision of the driver. Under such circumstances, there is known a technique in which, in order to improve the safety of a vehicle, a video of a camera is used to detect a person or an object and the detection result is used to call the driver's attention or control the vehicle.

As the control of a vehicle using a video of a camera, an automatic parking function based on a video of a camera photographing all the surroundings of the vehicle or the like is known. However, for example, there are many dark environmental scenes in the imaging region of a side camera, such as a region that vehicle light does not reach, and a visible camera capable of detecting visible light having wavelengths in a visible region has been unable to secure a video with sufficient sensitivity.

On the other hand, there is known a technique in which a camera having two wavelength bands equipped with an imaging element capable of detecting not only visible light but also near-infrared light having wavelengths in a near-infrared region and a near-infrared light source that emits near-infrared light (hereinafter, occasionally near infrared light being referred to as NIR for simplicity) are mounted on a vehicle and an image can be obtained even in an environment with a small amount of visible light, such as a low-illuminance region such as a lateral side of the vehicle, particularly in nighttime conditions.

However, in an environment with a large amount of visible light such as daytime, since the spectral distribution of the infrared light source and the spectral distribution of the visible light source are greatly different, there has been a case where appropriate white balance processing cannot be performed and unnecessary coloring occurs in the image. That is, it has been feared that a reduction in image quality, such as a reduction in color reproducibility of the image with respect to a subject, will be caused due to near-infrared light, which is detected in addition to visible light.

Thus, the present disclosure provides a vehicle, a vehicular camera, a video output method, a program, and a recording medium capable of suppressing a reduction in image quality in a vehicular camera having sensitivity to visible light and infrared light.

As a vehicle on which the vehicular camera according to the present disclosure is mounted, various vehicles such as a bicycle, a motorcycle, an automobile, and a train can be used as appropriate. Further, the vehicular camera according to the present disclosure is not limited to vehicle uses, and may be mounted on various moving bodies such as a ship and an aircraft. Here, the various moving bodies including a vehicle may be moving bodies that move in a manned manner, or may be moving bodies that move in an unmanned manner. The movement of these moving bodies may be controlled by the user, or may be autonomously controlled.

First Embodiment

FIG. 1 is a diagram schematically illustrating an example of a vehicle 1 according to an embodiment. As illustrated in FIG. 1, the vehicle 1 includes a vehicle body 12 and two pairs of wheels 13 arranged along a predetermined direction on the vehicle body 12. The two pairs of wheels 13 include a pair of front tires 13$f$ and a pair of rear tires 13$r$.

Here, the front tire 13$f$ according to the embodiment is an example of a first wheel. Further, the rear tire 13$r$ according to the embodiment is an example of a second wheel. Although FIG. 1 gives a vehicle 1 including four wheels 13 as an example, the present disclosure is not limited thereto. The vehicle 1 needs only to include at least one front tire 13$f$ and at least one rear tire 13$r$. That is, the number of wheels 13 of the vehicle 1 may be two, three, or five or more.

The vehicle body 12 is coupled to the wheels 13, and is supported by the wheels 13. The vehicle body 12 is capable of moving by means of the wheels 13. Specifically, the vehicle 1 includes a not-illustrated driving machine, and is capable of moving by driving at least one wheel (driving wheel) among the wheels 13 of the vehicle 1 by the power of the driving machine. As the driving machine, any driving machine such as an engine using gasoline, hydrogen, or the like as fuel, a motor using electric power from a battery, or a combination of an engine and a motor can be used. In this case, the predetermined direction in which the two pairs of wheels 13 are arranged is the traveling direction of the vehicle 1. The vehicle 1 can move forward or backward by switching not-illustrated gears or the like. The vehicle 1 can also turn right or left by steering.

The vehicle body 12 has a front end portion F that is an end portion on the front tire 13$f$ side and a rear end portion R that is an end portion on the rear tire 13$r$ side. The vehicle body 12 has a substantially rectangular shape in a top view, and four corners of the substantially rectangular shape may be referred to as end portions.

A pair of bumpers 14 are provided near the lower end of the vehicle body 12 in the front and rear end portions F and R of the vehicle body 12. A front bumper 14$f$ of the pair of bumpers 14 covers the entire front surface and parts of the side surfaces near a lower end portion of the vehicle body 12. A rear bumper 14$r$ of the pair of bumpers 14 covers the entire rear surface and parts of the side surfaces near the lower end portion of the vehicle body 12.

Although illustration is omitted in FIG. 1, the vehicle 1 includes a display 19 (see FIG. 2), a speaker, an operation unit, an orientation sensor, a global navigation satellite system (GNSS) interface such as a GPS (Global Positioning System), a GNSS circuit, etc. Further, sonar that transmits and receives a sound wave such as an ultrasonic wave or radar that transmits and receives an electromagnetic wave may be provided in a predetermined end portion of the vehicle body 12.

Figure 5:
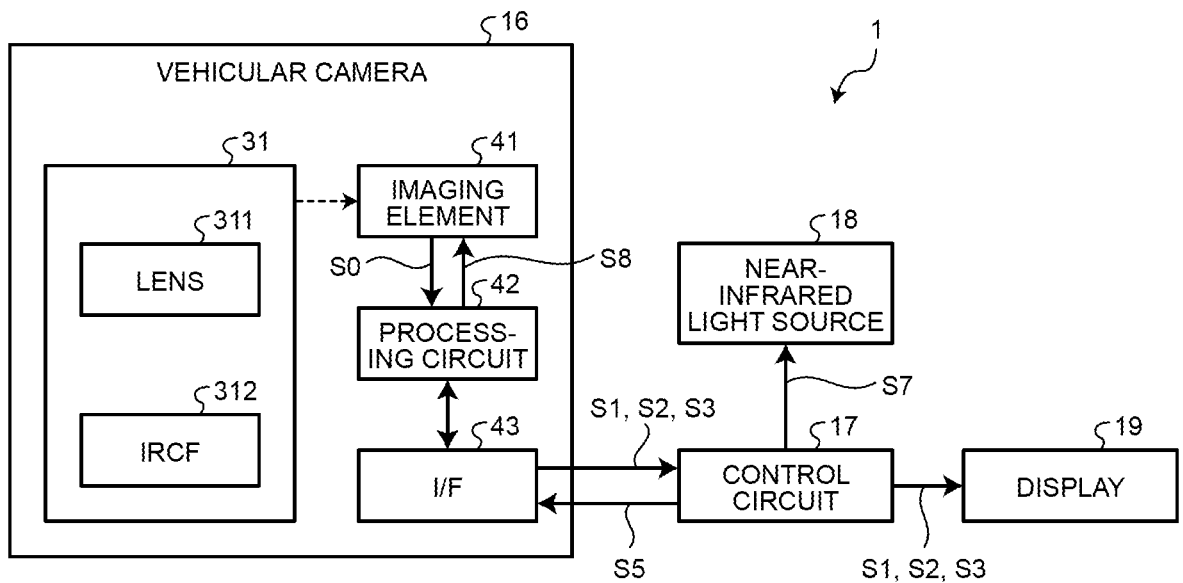
FIG. 5 is a diagram illustrating an example of a hardware configuration of a main part of the vehicle according to the embodiment.

The vehicle 1 includes at least one vehicular camera 16 that is attached to the vehicle body 12 and is configured to image at least part of the surroundings of the vehicle body 12 and output a video signal S1, S2, or S3 obtained by imaging (see FIG. 5). The image imaged by the vehicular camera 16 may be a moving image or a still image. The vehicle 1 includes, as the vehicular camera 16, for example, a vehicular camera 16$a$ attached to the front end portion F of the vehicle 1, a vehicular camera 16$b$ attached to the rear end portion R, a vehicular camera 16$c$ attached to a left side surface portion, and a vehicular camera 16$d$ (not illustrated) attached to a right side surface portion.

Here, the front end portion F of the vehicle 1 is, for example, an emblem portion of the vehicle 1 or the like. The vehicular camera 16$a$ in the front end portion F is attached in an attitude of, for example, looking down at a road surface in front of the vehicle 1 in an oblique direction. That is, the vehicular camera 16a in the front end portion F is configured to be capable of photographing a predetermined photographing region with the front of the vehicle 1 as the center.

The rear end portion R of the vehicle 1 is, for example, a rear license garnish portion of the vehicle 1 or the like. The vehicular camera 16b in the rear end portion R is attached in an attitude of, for example, looking down at a road surface behind the vehicle 1 in an oblique direction. That is, the vehicular camera 16b in the rear end portion R is configured to be capable of photographing a predetermined photographing region with the rear of the vehicle 1 as the center.

The left side surface portion and the right side surface portion of the vehicle 1, that is, side portions of the vehicle 1 are, for example, sideview mirror portions of the vehicle 1 or the like. Each of the vehicular cameras 16c and 16d in the side portions is attached in an attitude of, for example, looking down at a road surface on a lateral side of the vehicle 1 in a directly downward direction. That is, each of the vehicular cameras 16c and 16d in the side portions is configured to be capable of photographing a predetermined photographing region with a lateral of the vehicle 1 as the center.

Among the plurality of vehicular cameras 16, adjacent vehicular cameras 16 are, as an example, arranged such that parts of the photographing regions overlap with each other. In this case, an image expressing all the surroundings of the vehicle 1 can be generated by combining a plurality of images obtained by a plurality of vehicular cameras 16 in such a way to paste them together.

Hereinafter, when the vehicular camera 16a in the front end portion F, the vehicular camera 16b in the rear end portion R, the vehicular camera 16c in the left side surface portion, and the vehicular camera 16d (not illustrated) in the right side surface portion are not particularly distinguished, they are simply referred to as vehicular cameras 16. The positions and/or the number of vehicular cameras 16 are not limited to the example illustrated in FIG. 1, and can be changed as appropriate.

Figure 2:
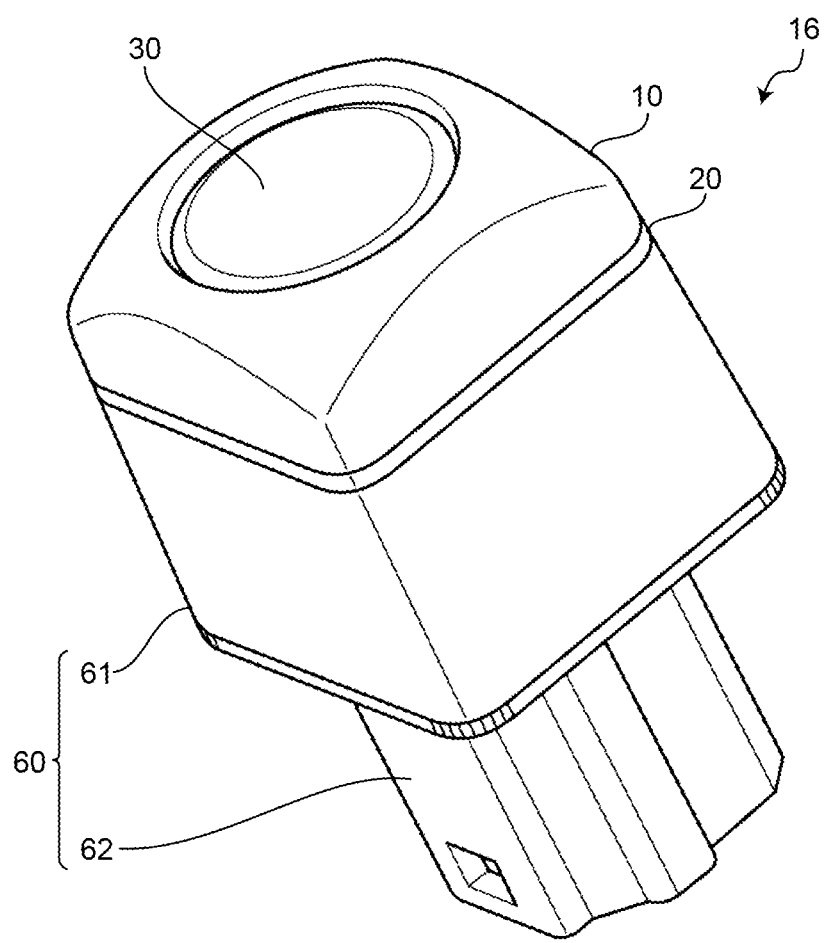
FIG. 2 is a top perspective view of a vehicular camera according to the embodiment.
Figure 3:
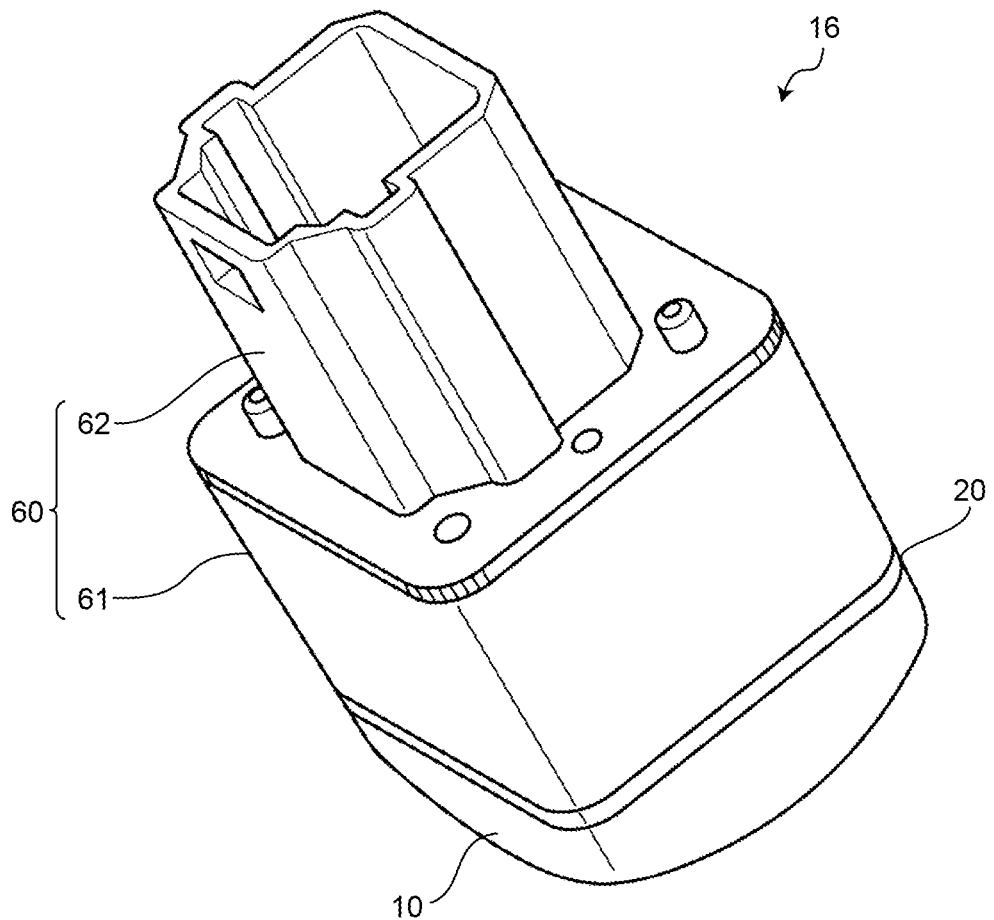
FIG. 3 is a bottom perspective view of the vehicular camera according to the embodiment.
Figure 4:
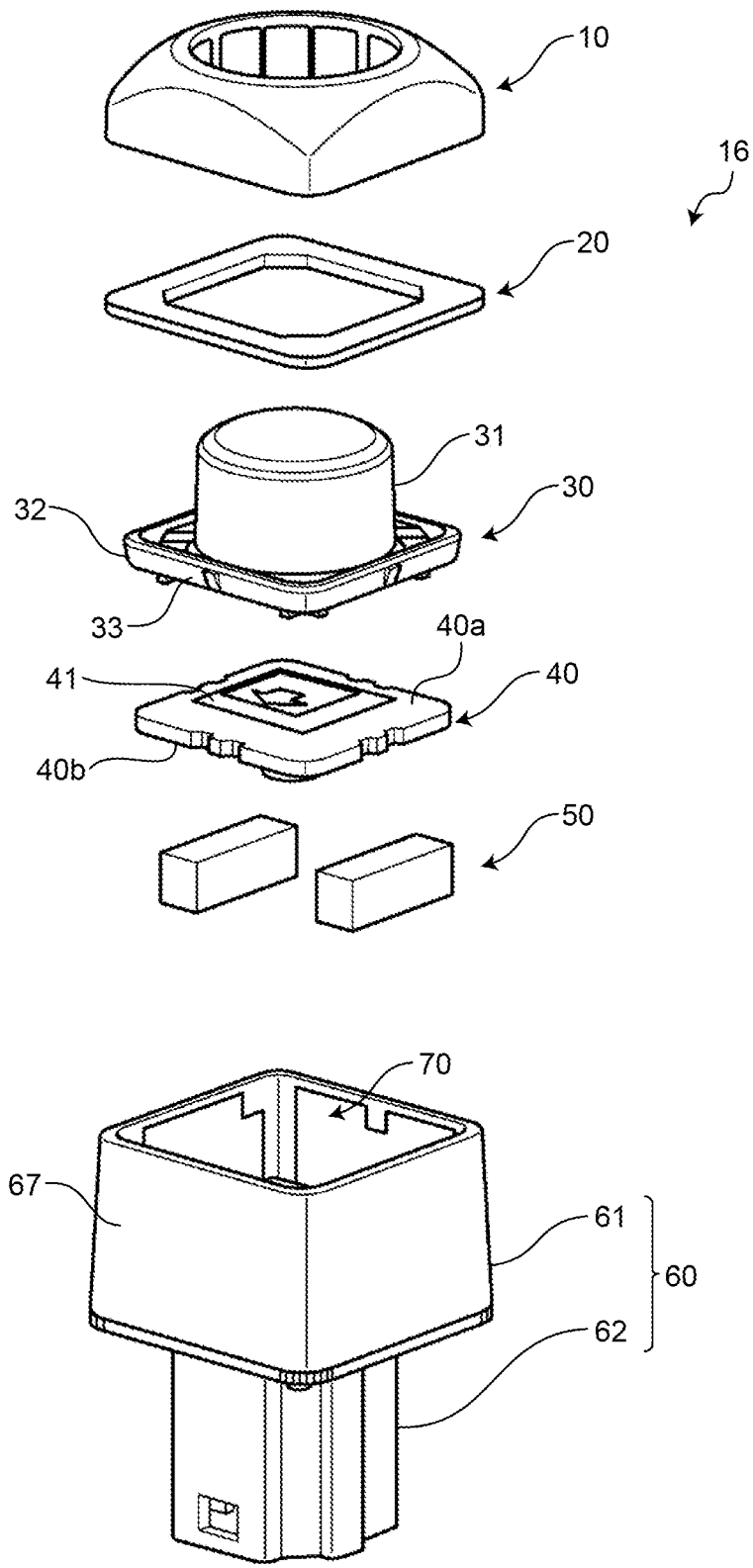
FIG. 4 is an exploded perspective view of the vehicular camera according to the embodiment.

FIG. 2 is a top perspective view of the vehicular camera 16 according to the embodiment. FIG. 3 is a bottom perspective view of the vehicular camera 16 according to the embodiment. FIG. 4 is an exploded perspective view of the vehicular camera 16 according to the embodiment.

The vehicular camera 16 of the present embodiment includes a cap 10, a welding ring 20, a lens unit 30, a circuit board 40 (see FIG. 3), a heat dissipation material 50 (see FIG. 3), and a housing 60.

The cap 10 is a member attached to the welding ring 20 and protecting the lens unit 30. In FIG. 3, illustration of the cap 10 is omitted.

The welding ring 20 is formed of a flat plate having a rectangular annular shape in a planar view, and is welded to the lens unit 30 and the housing 60 by laser welding. The inner peripheral surface of the welding ring 20 faces the outer peripheral surface of a lens barrel 31 (see a later description) of the lens unit 30. The inner diameter of the welding ring 20 has a length into which the lens barrel 31 of the lens unit 30 can be inserted.

The welding ring 20 is made of a material containing a light transmitting resin. For example, the light transmitting resin is formed of a polyester resin, a polyolefin resin, a polyamide resin, a vinyl chloride resin, a fluororesin, or the like. As the polyester resin, polybutylene terephthalate (PBT), polyethylene terephthalate (PET), or the like can be used. As the polyolefin resin, polyethylene, polypropylene, or the like can be used. As the light transmitting resin used, one kind or a plurality of kinds are possible. As long as a certain level or more of transmission capacity can be achieved, a coloring material or a filler, or both of them may be incorporated into a main light transmitting resin.

Although the welding ring 20 is in a flat-plate rectangular annular shape in the present embodiment, the present disclosure is not limited thereto, and it is sufficient that the welding portion be in a flat-plate shape. Thus, the shape is not limited to a polygon such as a rectangular annular shape, and may be a circular annular shape or an annular shape other than a circular annular shape, such as an elliptical annular shape. Further, in portions other than the welding portion, steps, thickness, etc. may not be uniform.

The lens unit 30 is composed of a circular cylindrical lens barrel 31 and at least one lens 311 (see FIG. 5) provided inside the lens barrel 31. The lens unit 30 has a flange 32 (see FIG. 3) projecting outward from the outer peripheral surface of the lens barrel 31. The flange 32 is located near an opening of the internal space of the housing 60 described later, and protrudes toward the inner peripheral surface of a housing side wall 67 (see FIG. 3) of the housing 60. At least part of the flange 32 is joined to the housing 60 via the welding ring 20.

The lens barrel 31 is made of a material containing a light absorbing resin. As the light absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, a polyether imide-based resin, or the like can be used. As the light absorbing resin used, one kind or a plurality of kinds are possible. An absorbent or a coloring material that absorbs laser light, or both of them may be incorporated into a main light absorbing resin.

By forming the lens barrel 31 out of a material containing a light absorbing resin, transmission of light to the internal space can be reduced. That is, transmission of light from outside the vehicular camera 16 into inside the vehicular camera 16 can be reduced. Therefore, halation of an imaging element 41 (see a later description) due to transmitted light can be prevented.

The lens unit 30 further includes a positioning rib 33 that stands in an orthogonal direction (in other words, a plane direction) orthogonal to the optical axis of the lens unit 30 (the up-down direction of the drawing sheet of FIG. 3) in order to perform positioning with respect to the housing 60. Thereby, the imaging surface of the imaging element 41 provided on the circuit board 40 can be disposed on the optical axis of at least one lens 311.

The circuit board 40 is disposed in the internal space of the housing 60. The circuit board 40 is formed of at least one substrate. FIG. 4 gives a circuit board 40 formed of one substrate as an example. The circuit board 40 has a first surface 40a and a second surface 40b opposite to the first surface 40a. The circuit board 40 includes an imaging element 41 and a processing circuit 42 (see FIG. 5). At least the imaging element 41 out of the imaging element 41 and the processing circuit 42 is disposed on the first surface 40a of the circuit board 40. The imaging element 41 and the processing circuit 42 will be described later.

The circuit board 40 may be composed of two or more substrates. Further, in the circuit board 40, the imaging element 41 and the processing circuit 42 may be provided on different substrates. Alternatively, in the circuit board 40, the imaging element 41 may be disposed on the first surface 40a, and the processing circuit 42 may be disposed on the second surface 40b.

The heat dissipation material 50 is disposed adjacent to the circuit board 40 in the internal space of the housing 60, and plays a role of dissipating heat generated from an electronic component such as the circuit board 40 outside. The heat dissipation material 50 is made of a material such as heat dissipation grease, a silicone-based sheet, a non-silicone-based sheet, or a thermally conductive gel, but the kind is not limited.

The housing 60 houses at least the circuit board 40. Specifically, the housing 60 is a cylindrical member having an internal space, and has a large-diameter cylindrical portion 61 and a small-diameter cylindrical portion 62. The large-diameter cylindrical portion 61 has a cross-sectional area larger than that of the small-diameter cylindrical portion 62, and both have rectangular cross sections. The large-diameter cylindrical portion 61 houses the circuit board 40, the heat dissipation material 50, etc. described above. The small-diameter cylindrical portion 62 exclusively houses a connector that ensures electrical connection to outside the vehicular camera 16. The large-diameter cylindrical portion 61 and the small-diameter cylindrical portion 62 can be integrally molded with a resin described later, but an individual large-diameter cylindrical portion 61 and an individual small-diameter cylindrical portion 62 prepared in advance may be joined by a method such as welding or screwing. Although the housing 60 is in a rectangular cylindrical shape in the present embodiment, the shape is not limited thereto, and may be a cylindrical shape of a polygon other than a rectangle, a circular or elliptical cylindrical shape, or other cylindrical shapes.

The housing 60 is made of a material containing a light absorbing resin. As the light absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, a polyether imide-based resin, or the like can be used. As the light absorbing resin used, one kind or a plurality of kinds are possible. An absorbent or a coloring material that absorbs laser light, or both of them may be incorporated into a main light absorbing resin.

By forming the housing 60 out of a material containing a light absorbing resin, transmission of light to the internal space of the housing 60 can be reduced. That is, transmission of light from outside the vehicular camera 16 into inside the vehicular camera 16 can be reduced. Therefore, halation of the imaging element 41 due to transmitted light can be prevented.

The vehicular camera 16 of the embodiment further includes a metallic shield 70 disposed to surround the circuit board 40 in the internal space of the housing 60. The shield 70 plays a role of blocking electromagnetic waves propagating from outside the housing 60 and electromagnetic waves radiated from the internal space.

FIG. 5 is a diagram illustrating an example of a hardware configuration of a main part of the vehicle 1 according to the embodiment.

The lens barrel 31 holds at least one lens 311 (a lens group) and an infrared cut filter (IRCF) 312 (see FIG. 5) inside.

The at least one lens 311 is arranged in a state where the optical axes thereof are made to coincide, and constitutes a lens group used for imaging inside and outside the vehicle body 12 of the vehicle 1. The at least one lens 311 needs only to have desired image-forming properties by means of at least one optical element having power, and may be formed of a compound lens including at least one single lens or may be formed of a combination of a lens system and a reflection system.

The IRCF 312 is an optical element having bandpass characteristics for visible light and near infrared light. The bandpass region of near-infrared light is a wavelength band of, for example, about 940 to 950 nm, which is less affected by natural light in daytime conditions, and may be determined according to the spectral sensitivity of the imaging element 41, as appropriate. As an example, the IRCF 312 is formed of glass, and is disposed between an image-forming lens of the at least one lens 311 and the imaging surface of the imaging element 41. As an example, the IRCF 312 is a coating formed on a glass surface, and is disposed between an image-forming lens of the at least one lens 311 and the imaging surface of the imaging element 41. As an example, the IRCF 312 is a thin film formed by application or vapor deposition in a coat form on a lens surface of the at least one lens 311.

The imaging element 41 is disposed on the first surface 40a of the circuit board 40 such that the imaging surface is located on the optical axis of the at least one lens 311. The imaging surface of the imaging element 41 is disposed in a position where a luminous flux from a subject is formed as an image by the at least one lens 311 in the optical axis direction of the at least one lens 311. The imaging element 41 has spectral sensitivity at least to visible light to near infrared light. The imaging element 41 is configured to output a pixel signal S0 of a signal level according to the received light intensity of a luminous flux from a subject, that is, a subject luminous flux formed as an image on the imaging surface via the lens unit 30.

Here, the pixel signal S0 according to the present embodiment is an example of a first video signal. In video output processing according to the present embodiment, an illuminance estimation value is calculated on the basis of the pixel signal S0. That is, the imaging element 41 according to the embodiment can be expressed as, in the vehicular camera 16 attached to the vehicle body 12, an example of an illuminance sensor configured to detect the illuminance of at least part of the surroundings of the vehicle body 12.

An illuminance sensor may be mounted on the vehicle 1. The illuminance sensor is attached to the vehicle body 12, and needs only to be configured to detect the illuminance of at least part of the surroundings of the vehicle body 12. In this case, video output processing according to the embodiment may be performed using at least one of a result of detection by the illuminance sensor and an estimation result based on the pixel signal S0.

As the imaging element 41, a solid-state imaging element such as a CCD (charge-coupled device) or a CMOS (complementary metal-oxide-semiconductor) can be used as appropriate. As an example, the imaging element 41 is a solid-state imaging element including a color filter of a Bayer array structure. The Bayer array structure refers to a color filter array structure in which lines in each of which R pixels and Gr pixels are alternately arranged in the horizontal direction and lines in each of which B pixels and Gb pixels are alternately arranged in the horizontal direction are alternately arranged in the vertical direction.

Figure 6:
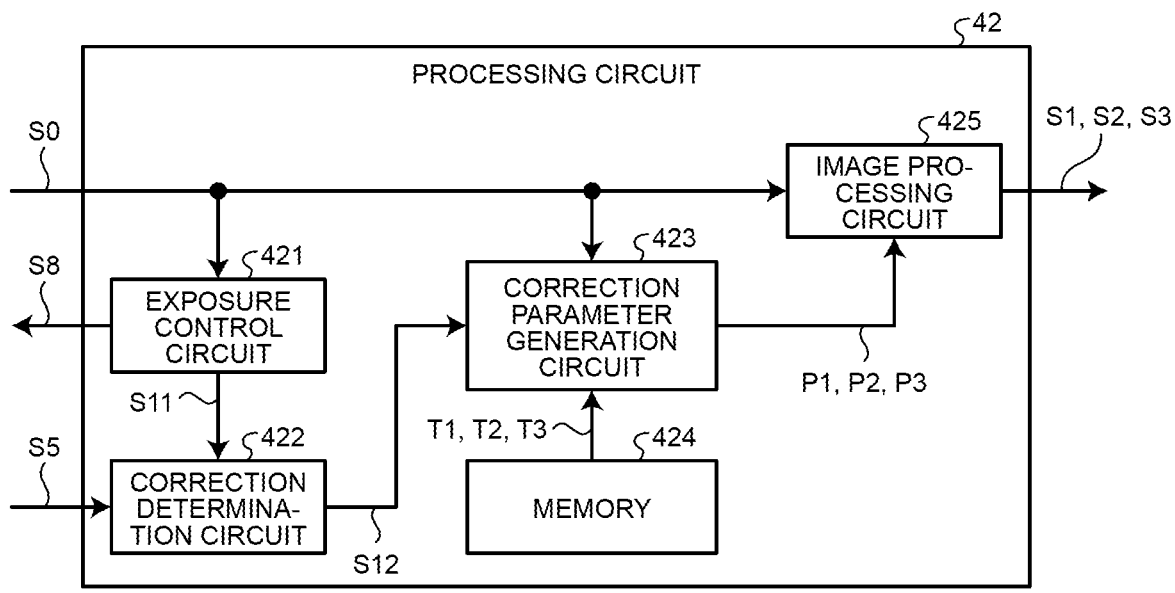
FIG. 6 is a diagram illustrating an example of a hardware configuration of a processing circuit of the vehicular camera according to the embodiment.

The processing circuit 42 is configured to subject a pixel signal S0 from the imaging element 41 to image processing according to a state notification S5 of a near-infrared light source 18 from a control circuit 17 and output any of video signals S1, S2, and S3 after processing. FIG. 6 is a diagram illustrating an example of a hardware configuration of the processing circuit 42 of the vehicular camera 16 according to the embodiment. As illustrated in FIG. 6, the processing circuit 42 includes an exposure control circuit 421, a correction determination circuit 422, a correction parameter generation circuit 423, a memory 424, and an image processing circuit 425.

The processing circuit 42 is implemented by, for example, an ISP (image signal processor). The processing circuit 42 may be implemented by a DSP (digital signal processor) other than an ISP, or may be implemented by various processors such as a CPU (central processing unit), a GPU (graphics processing unit), an ASIC (application specific integrated circuit), and an FPGA (field programmable gate array). Further, the processing circuit 42 may be implemented by a microcomputer.

Each of the exposure control circuit 421, the correction determination circuit 422, the correction parameter generation circuit 423, and the image processing circuit 425 may be implemented by two or more processors. Further, some or all of the exposure control circuit 421, the correction determination circuit 422, the correction parameter generation circuit 423, and the image processing circuit 425 may be implemented by one processor.

Although a case where each of the exposure control circuit 421, the correction determination circuit 422, the correction parameter generation circuit 423, and the image processing circuit 425 is implemented as a dedicated circuit is given as an example, the present disclosure is not limited thereto. The processing circuit 42 may implement a functional unit corresponding to each of the exposure control circuit 421, the correction determination circuit 422, the correction parameter generation circuit 423, and the image processing circuit 425 by loading a program stored in a ROM of the memory 424 or the like on a RAM and executing the program.

The exposure control circuit 421 outputs an exposure control signal S8 to the imaging element 41, and calculates an illuminance estimation value on the basis of pixel signals S0 from the imaging element 41.

The correction determination circuit 422 executes correction determination processing on the basis of a state notification S5 regarding the state of the near-infrared light source 18 and a result of illuminance value estimation by illuminance estimation processing.

The correction parameter generation circuit 423 generates a white detection frame as a white detection criterion, generates a correction gain, estimates a color temperature, and generates a correction parameter. As an example, the correction parameter generation circuit 423 sets the range of a white detection frame on the basis of a result of correction determination for the near-infrared light source. Further, the correction parameter generation circuit 423 estimates the color temperature of the light source on the basis of color ratios extracted from an image. Further, the correction parameter generation circuit 423 calculates a correction parameter in image processing on the basis of a result of color temperature estimation.

The memory 424 is implemented by, for example, a semiconductor memory (storage medium) such as a RAM (random access memory) or a ROM (read-only memory). The memory 424 may include an HDD (hard disk drive) or an SSD (solid state drive). The memory 424 stores, for example, various parameters, thresholds, etc. used in image processing. For example, the memory 424 stores, as a table, a white detection frame, a color temperature, and an image correction value for each light source. In other words, the memory 424 stores, as a table, an optimum image processing setting for each of the color temperatures of light sources.

The image processing circuit 425 sets a correction parameter calculated by the correction parameter generation circuit 423, and executes at least one of white balance processing and color correction processing using the set correction parameter.

An I/F 43 is set to connect to, for example, a CAN (Controller Area Network). The I/F 43 acquires information regarding the state of the vehicle 1 from another ECU or various sensors of the vehicle 1 via a CAN, for example. The information regarding the state of the vehicle 1 is, for example, the speed, steering angle, acceleration, etc. of the vehicle 1. As an example, the I/F 43 receives a state notification S5 of the near-infrared light source 18 from another ECU (for example, the control circuit 17) of the vehicle 1. Further, the I/F 43 transmits the video signal S1, S2, or S3 after processing by the processing circuit 42 to another ECU (for example, the control circuit 17) of the vehicle 1. Here, the I/F 43 is, in the vehicular camera 16, an example of an output circuit configured to be capable of performing outputting into inside the vehicle body 12.

As an example, when the near-infrared light source 18 has a first light emission intensity, the I/F 43 outputs the second video signal S2 in which at least part of the pixel signals S0 are subjected to white balance correction processing for visible light. Here, the white balance correction processing for visible light is an example of a first correction processing.

As an example, when the near-infrared light source 18 has a second light emission intensity larger than the first light emission intensity and furthermore the illuminance is smaller than a predetermined value, the I/F 43 outputs the third video signal S3 in which at least part of the pixel signals S0 are subjected to white balance correction processing for near-infrared light different from the white balance correction processing for visible light. Here, the white balance correction processing for near-infrared light is an example of a second correction processing.

As an example, when the near-infrared light source 18 has the second light emission intensity and furthermore the illuminance is larger than the predetermined value, the I/F 43 outputs the second video signal S2 in which at least part of the pixel signals S0 are subjected to white balance correction processing for visible light.

As illustrated in FIGS. 1 and 5, the vehicle 1 includes the control circuit 17 and the near-infrared light source 18. Further, as illustrated in FIG. 5, the vehicle 1 includes the display 19.

The control circuit 17 is disposed inside the vehicle body 12. For example, the control circuit 17 is an information processing device set to be mounted on the vehicle 1, and is, for example, an ECU (electronic control unit) or an OBU (on-board unit) provided inside the vehicle 1. Alternatively, the control circuit 17 may be an external add-on device installed near a dashboard of the vehicle 1. Here, the control circuit 17 is an example of an output circuit disposed inside the vehicle 1.

The control circuit 17 is connected to each of the plurality of vehicular cameras 16. The control circuit 17 controls the operation of the near-infrared light source 18. Further, the control circuit 17 transmits, to the vehicular camera 16 side via the I/F 43, a state notification S5 of the near-infrared light source 18 that notifies the lit/unlit state of the near-infrared light source 18, that is, notifies whether the near-infrared light source 18 is in a light emission state or a non-light emission state.

The control circuit 17 may be configured to be capable of implementing video output processing according to the embodiment. That is, the control circuit 17 may be configured to be capable of implementing part of the function of the processing circuit 42 according to the embodiment. In this case, the vehicular camera 16 outputs a pixel signal S0 or a first video signal S1 based on a pixel signal S0 to the control circuit 17 via the I/F 43. The control circuit 17 performs video output processing based on a first video signal S1, and thus outputs the first video signal S1, a second video signal S2, or a third video signal S3 to the display 19.

The near-infrared light source 18 is attached to the vehicle body 12, and is configured to irradiate at least part of the surroundings of the vehicle body 12 with near-infrared light. The near-infrared light source 18 is disposed in the vicinity of the vehicular camera 16, for example on a sideview mirror or the like. The near-infrared light source 18 is configured such that the turning on/off can be controlled from the control circuit 17.

The near-infrared light source 18 is switched between a first light emission state in which light is emitted with a first light emission intensity that is a light emission intensity when electric power is not supplied and a second light emission state in which light is emitted with a second light emission intensity larger than the first light emission intensity when electric power is supplied. The first light emission intensity is a light emission state that can be regarded as an unlit state, and includes a case where the light emission intensity is 0 (zero). Similarly, the second light emission intensity is a light emission state that can be regarded as a lit state.

The display 19 includes a screen that displays a video. The video displayed on the screen includes the first video signal S1, the second video signal S2, or the third video signal S3 supplied from the control circuit 17. The display 19 may be common to a display of a car navigation device.

Although in the present embodiment a case where the vehicular camera 16 is built in the vehicle 1 is given as a example, the present disclosure is not limited thereto. The vehicular camera 16 may be configured as a device independent of the vehicle 1, such as a camera of a drive recorder that can be retrofitted to the vehicle 1. In this case, video output processing according to the embodiment may be executed by the vehicular camera 16, or may be executed by the vehicle 1. In other words, video output processing according to the embodiment may be executed by a vehicular camera 16 configured as a device independent of the vehicle 1, or may be executed by the control circuit 17 on the basis of the first video signal S1 from a vehicular camera 16 configured as a device independent of the vehicle 1.

Figure 7:
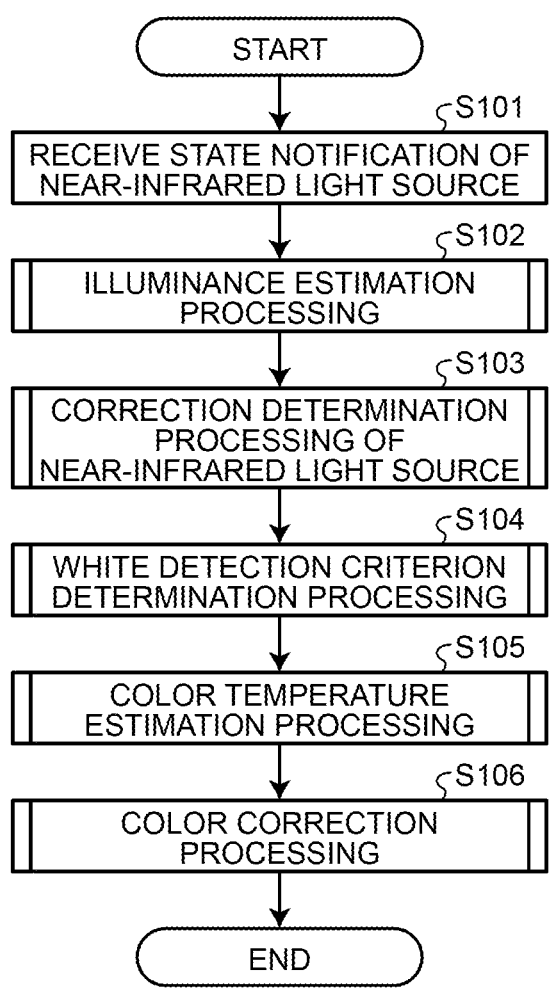
FIG. 7 is a flowchart illustrating an example of a flow of video output processing executed in a vehicle 1 according to the embodiment.

Next, a flow of video output processing executed in the vehicle 1 equipped with the vehicular camera 16 configured in the above manner is described. FIG. 7 is a flowchart illustrating an example of a flow of video output processing executed in the vehicle 1 according to the embodiment.

In the vehicular camera 16, the I/F 43 receives a state notification S5 regarding the state of the near-infrared light source 18 from the control circuit 17 provided inside the vehicle 1 (S101). The I/F 43 supplies the received state notification S5 to the processing circuit 42. Further, in the vehicular camera 16, the imaging element 41 supplies, to the processing circuit 42, pixel signals S0 of signal levels according to the received light intensities of a subject luminous flux that is formed as an image on the imaging surface via the lens unit 30, for example in a sequential manner at a frequency according to the frame rate.

In the processing circuit 42, the exposure control circuit 421 executes illuminance estimation processing of, on the basis of the pixel signals S0, detecting illuminance by calculating an illuminance estimation value for at least part of the surroundings of the vehicle body 12 (S102). The illuminance estimation processing will be described later.

In the processing circuit 42, the correction determination circuit 422 executes correction determination processing of determining whether to turn on near-infrared light source correction for reducing the influence of near-infrared components or not on the basis of the state notification S5 regarding the state of the near-infrared light source 18 received by the I/F 43 and the result of illuminance value estimation by illuminance estimation processing (S103). The correction determination processing will be described later.

In the processing circuit 42, the correction parameter generation circuit 423 executes white detection criterion determination processing of, on the basis of the result of correction determination processing, determining a white detection criterion in white balance processing (S104). Specifically, on the basis of the result of correction determination processing, the correction parameter generation circuit 423 switches, between the visible light source and the near-infrared light source, the range of a white detection frame that defines color temperature coordinate values satisfying a white detection criterion. The white detection criterion determination processing will be described later.

Further, the correction parameter generation circuit 423 executes color temperature estimation processing of estimating the color temperature of the light source on the basis of color ratios extracted from the pixel signals S0 (S105). The color temperature estimation processing will be described later.

Then, the processing circuit 42 uses the correction parameter generation circuit 423 to read out correction parameters suitable for the light source on the basis of the color temperature estimation value, and uses the image processing circuit 425 to execute color correction processing of performing at least one of white balance correction processing and color correction processing (S106). The color correction processing will be described later.

Figures 8, 9:
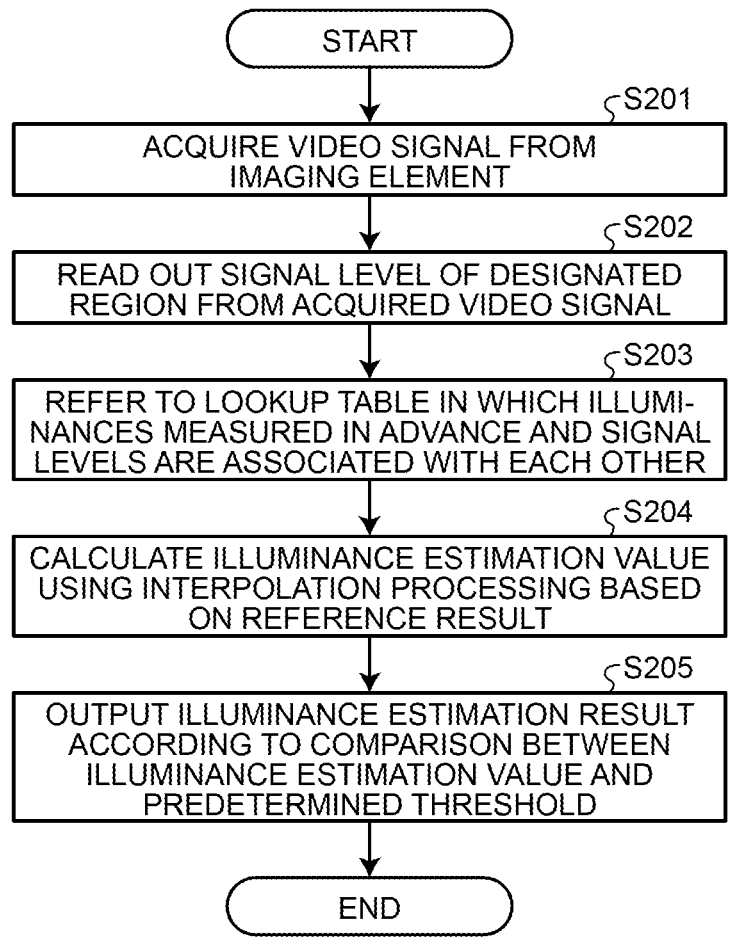
FIG. 8 is a flowchart illustrating an example of a flow of illuminance estimation processing of FIG. 7.
FIG. 9 is a diagram illustrating an example of a table indicating correspondence between illuminance and signal level used in the processing of FIG. 8.

Here, the illuminance estimation processing in the video output processing according to the embodiment will now be described. FIG. 8 is a flowchart illustrating an example of a flow of the illuminance estimation processing of FIG. 7. FIG. 9 is a diagram illustrating an example of table T1 indicating correspondence between illuminance and signal level used in the processing of FIG. 8.

The exposure control circuit 421 acquires a video signal (pixel signals S0) from the imaging element 41 (S201).

The exposure control circuit 421 reads out the signal level of a designated region from the acquired pixel signals S0 (S202). Here, the designated region is a region for photometry, and is the region of at least part of the surroundings of the vehicle body 12. The designated region is, for example, set in advance according to the imaging range of the vehicular camera 16 and stored in the memory 424 or the like in advance. The designated region may be the entirety or part of the imaging range of the vehicular camera 16.

The exposure control circuit 421 refers to lookup table T1 in which illuminance measured in advance and signal level are associated with each other, and reads out values of illuminance according to the signal level of the designated region and the exposure setting value at the time of imaging (S203). Lookup table T1 of FIG. 9 indicates correspondence among illuminances (Lux), exposure values, and signal levels. Although in the present embodiment a case where lookup table T1 is used is given as an example, a relational expression indicating a relationship between the illuminance measured in advance and the signal level may be used.

The exposure control circuit 421 performs interpolation processing using the illuminance read out from lookup table T1, and thereby calculates an illuminance estimation value according to the signal level of the designated region (S204).

The exposure control circuit 421 outputs an illuminance estimation result according to a comparison between the illuminance estimation value and a predetermined threshold stored in the memory 424 or the like (S205). As an example, the threshold is, for example, an illuminance when the near-infrared light source 18 has the second light emission intensity. In this case, when the illuminance estimation value is less than the threshold, the near-infrared light source 18 can be regarded as being lit. Similarly, when the illuminance estimation value is equal to or greater than the threshold, the illuminance is one when the near-infrared light source 18 has the first light emission intensity, and the near-infrared light source 18 can be regarded as not being lit.

Figure 10:
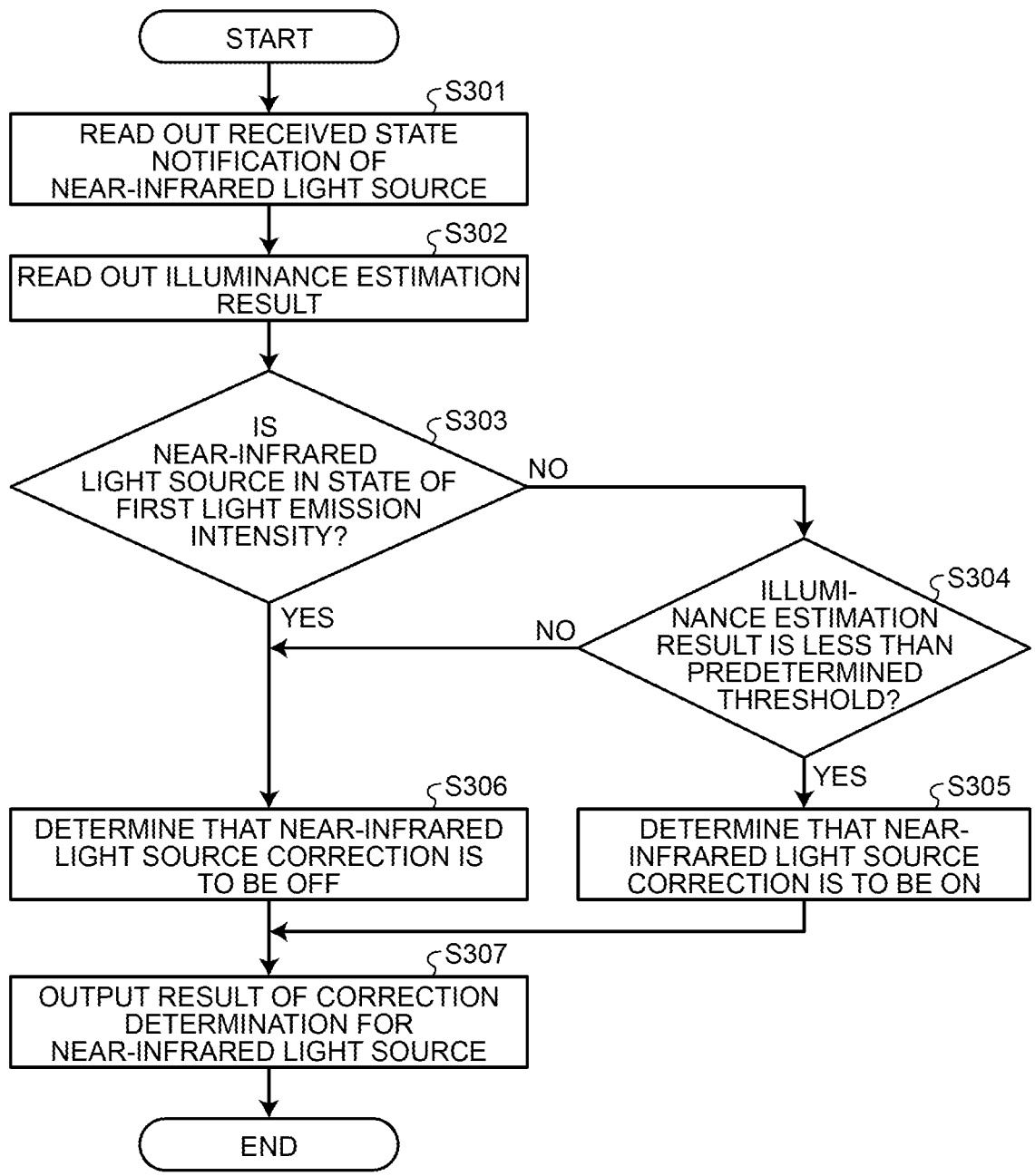
FIG. 10 is a flowchart illustrating an example of a flow of correction determination processing for a near-infrared light source of FIG. 7.

Here, the correction determination processing in the video output processing according to the embodiment will now be described. FIG. 10 is a flowchart illustrating an example of a flow of the correction determination processing for the near-infrared light source of FIG. 7.

The correction determination circuit 422 reads out a state notification S5 of the near-infrared light source 18 received from the control circuit 17 and stored in the memory 424 (S301). Further, the correction determination circuit 422 reads out an illuminance estimation result outputted by the exposure control circuit 421 and stored in the memory 424 (S302).

The correction determination circuit 422 determines whether the light emission state of the near-infrared light source 18 is the first light emission intensity or not (S303). When the near-infrared light source 18 does not have the first light emission intensity (S303: No), that is, when the near-infrared light source 18 is lit (when it has the second light emission intensity), the correction determination circuit 422 determines whether the illuminance estimation result is less than a predetermined threshold or not (S304). When the illuminance estimation result is less than the predetermined threshold (S304: Yes), that is, when the environment is a low-illuminance environment, the correction determination circuit 422 determines that near-infrared light source correction is to be on (S305).

On the other hand, when the near-infrared light source 18 has the first light emission intensity (S303: Yes) or when the illuminance estimation result is equal to or greater than the predetermined threshold (S304: No), the correction determination circuit 422 determines that near-infrared light source correction is to be off (S306). That is, when the near-infrared light source 18 is unlit or when the near-infrared light source 18 is lit and furthermore the environment is one where the illuminance is equal to or greater than the threshold, the correction determination circuit 422 determines that near-infrared light source correction is to be off.

After that, the correction determination circuit 422 outputs a result of correction determination for the near-infrared light source 18 (S307).

Figure 11:
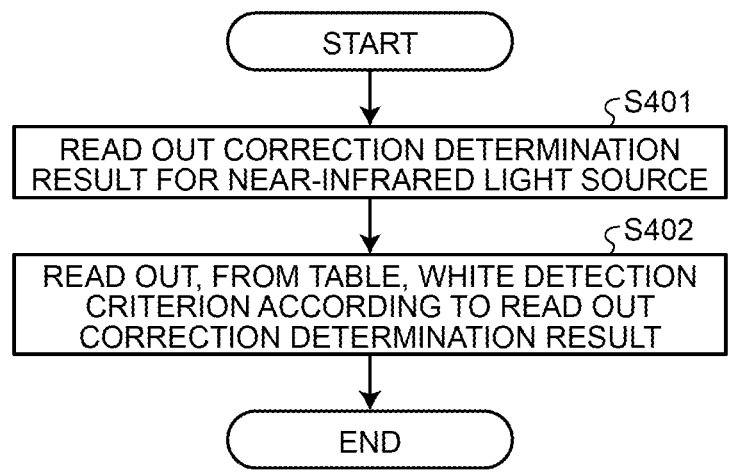
FIG. 11 is a flowchart illustrating an example of a flow of white detection criterion determination processing of FIG. 7.
Figure 12:
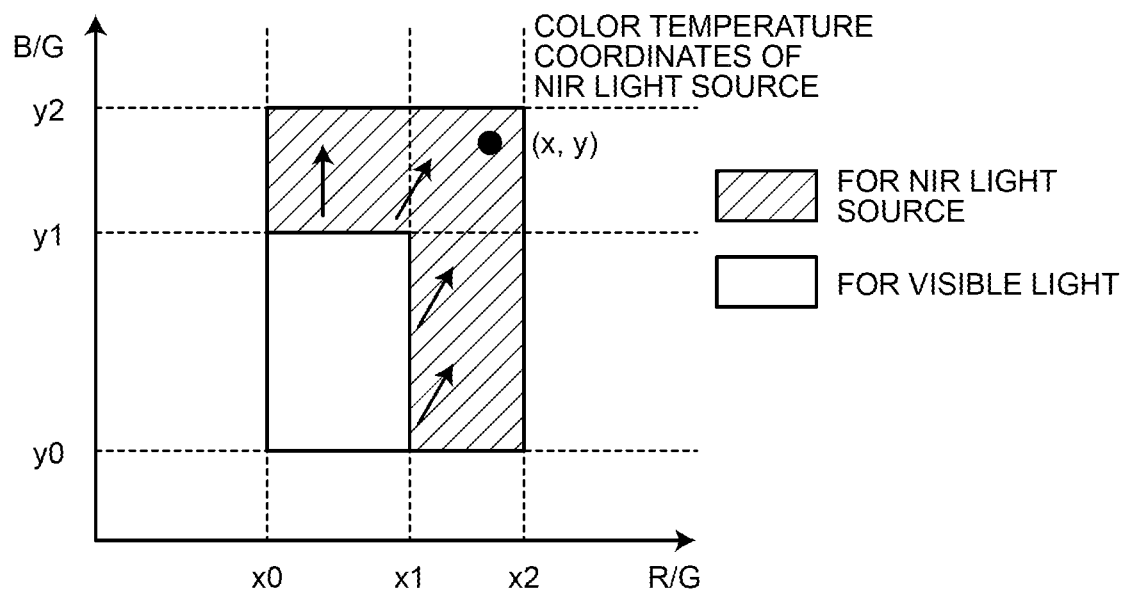
FIG. 12 is a diagram for describing a white detection criterion determined by the processing of FIG. 11.

Here, the white detection criterion determination processing in the video output processing according to the embodiment will now be described. FIG. 11 is a flowchart illustrating an example of a flow of the white detection criterion determination processing of FIG. 7. FIG. 12 is a diagram for describing a white detection criterion determined by the processing of FIG. 11.

The correction parameter generation circuit 423 reads out a correction determination result outputted by the correction determination circuit 422 and stored in the memory 424 (S401). Then, the correction parameter generation circuit 423 reads out, from a table, a white detection criterion according to the read out correction determination result (S402). In this way, the correction parameter generation circuit 423 sets the range of a white detection frame on the basis of the result of correction determination for the near-infrared light source.

In the present embodiment, a case where a white detection frame that defines a range of color temperature coordinates in a color coordinate system using color ratios (B/G, R/G) that indicate the signal levels of an R pixel and a B pixel with the signal level of a G pixel as a reference is used as a white detection criterion is given as an example.

As an example, for a correction determination result in which near-infrared light source correction is to be off, the correction parameter generation circuit 423 reads out a white detection frame for visible light (in FIG. 12, x0 to x1 and y0 to y1) from a table stored in the memory 424. Here, the white detection frame in the color coordinate system for visible light is an example of a first detection frame. The white detection frame for visible light does not include the color temperature coordinates (x, y) of the near-infrared light source 18 in the color coordinate system.

As an example, for a correction determination result in which near-infrared light source correction is to be on, the correction parameter generation circuit 423 reads out a white detection frame for a near-infrared light source (in FIG. 12, x0 to x2 and y0 to y2) from the table stored in the memory 424. Here, the white detection frame in the color coordinate system for near-infrared light is an example of a second detection frame. As given as an example in FIG. 12, the white detection frame for a near-infrared light source is larger than the white detection frame for visible light in the color coordinate system. The white detection frame for a near-infrared light source includes the color temperature coordinates (x, y) of the near-infrared light source 18 in the color coordinate system. The color temperature coordinates (x, y) of the near-infrared light source 18 indicate a color temperature corresponding to light emitted by the near-infrared light source 18.

Figure 13:
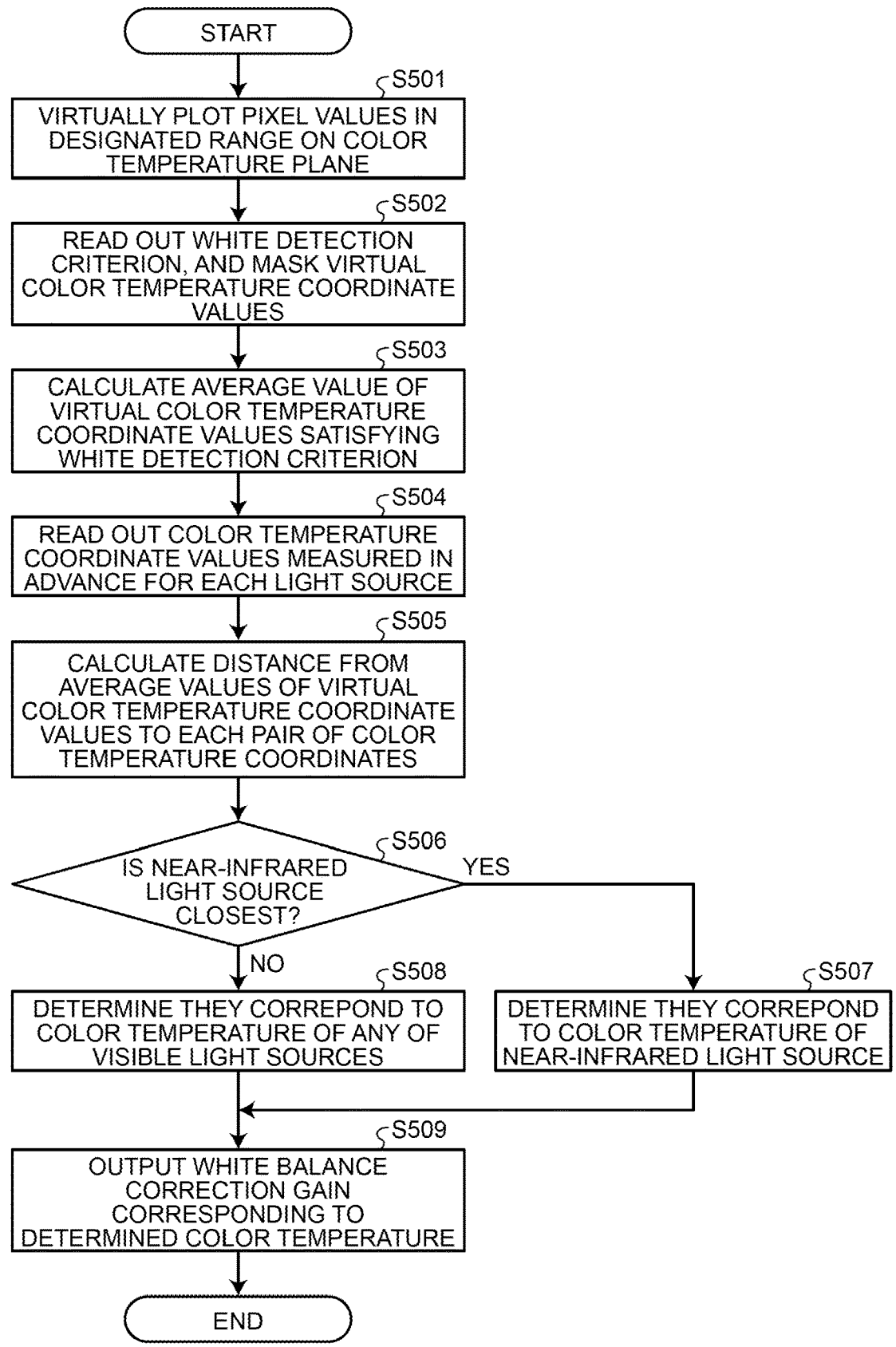
FIG. 13 is a flowchart illustrating an example of a flow of color temperature estimation processing of FIG. 7.
Figures 14, 15:
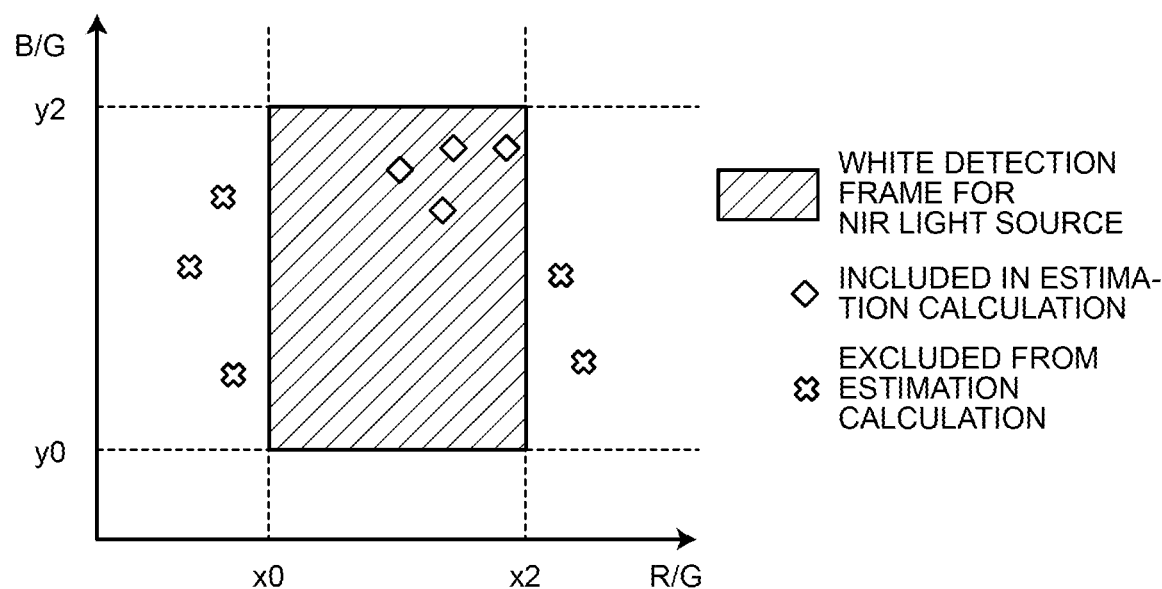
FIG. 14 is a diagram for describing virtual color temperature coordinate values satisfying a white detection criterion in the processing of FIG. 13.
FIG. 15 is a diagram illustrating an example of a table indicating correspondence between light sources and color temperature coordinate values used in the processing of FIG. 13.
Figure 16:
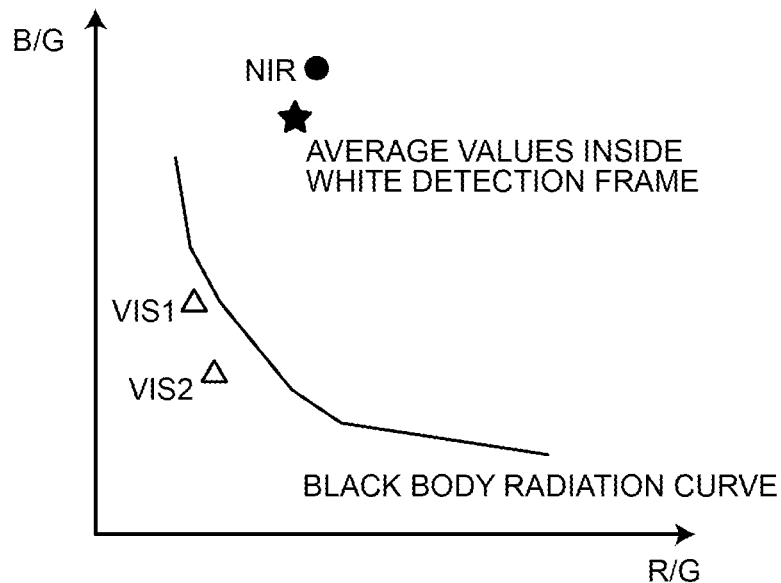
FIG. 16 is a diagram for describing color temperature estimated in the processing of FIG. 13.

Here, the color temperature estimation processing in the video output processing according to the embodiment will now be described. FIG. 13 is a flowchart illustrating an example of a flow of the color temperature estimation processing of FIG. 7. FIG. 14 is a diagram for describing virtual color temperature coordinate values satisfying a white detection criterion in the processing of FIG. 13. FIG. 14 gives, as an example, a case where it is determined that near-infrared light source correction is to be on. FIG. 15 is a diagram illustrating an example of table T2 indicating correspondence between light sources and color temperature coordinate values used in the processing of FIG. 13. FIG. 16 is a diagram for describing color temperature estimated in the processing of FIG. 13.

The correction parameter generation circuit 423 converts the pixel values in a designated range of the pixel signals S0 into color temperatures, and virtually plots the color temperatures on a color temperature plane (S501).

The correction parameter generation circuit 423 reads out a white detection criterion set in white detection criterion determination processing, and masks the virtual color temperature coordinate values (S502). Further, the correction parameter generation circuit 423 calculates the average values of the virtual color temperature coordinate values satisfying the white detection criterion (S503). Specifically, the correction parameter generation circuit 423 excludes the virtual color temperature coordinate values outside the white detection frame (the x mark in FIG. 14), and calculates the average values of the virtual color temperature coordinate values inside the white detection frame (the diamond in FIG. 14).

After that, the correction parameter generation circuit 423 reads out color temperature coordinate values measured in advance for each light source (S504). As given as an example in FIG. 15, the color temperature coordinate values measured in advance are stored in the memory 424 or the like as lookup table T2 indicating correspondence among light source types, color temperature, and color ratios (B/G, R/G). Here, the color ratios (B/G, R/G) are, as described above, color temperature coordinate values in the color coordinate system given as an example in FIG. 14, etc. In the example illustrated in FIG. 15, a light source of which the light source type is a visible light source is expressed as VIS, and a light source of which the light source type is a near-infrared light source is expressed as NIR. For example, for VIS1, of which the light source type is a visible light source, the color temperature is 6500 K (Kelvin), the color ratio of B/G is 0.5, and the color ratio of R/G is 0.6. For NIR, of which the light source type is a near-infrared light source, the color ratio of B/G is 1.1, and the color ratio of R/G is 1.1.

Further, the correction parameter generation circuit 423 calculates the distance (exactly, the Euclidean distance) from the average values of the virtual color temperature coordinate values (the star sign in FIG. 16) to each pair of color temperature coordinates (S505). In the example illustrated in FIG. 16, a light source of which the light source type is a visible light source is expressed as VIS, and a light source of which the light source type is a near-infrared light source is expressed as NIR. In the example illustrated in FIG. 16, the correction parameter generation circuit 423 calculates the distance from the average values of the virtual color temperature coordinate values to VIS1 in the color coordinate system, the distance from the average values of the virtual color temperature coordinate values to VIS2 in the color coordinate system, and the distance from the average values of the virtual color temperature coordinate values to NIR in the color coordinate system.

After that, the correction parameter generation circuit 423 determines whether the near-infrared light source is the closest or not (S506). When the near-infrared light source is the closest (S506: Yes), the correction parameter generation circuit 423 determines the average values of the virtual color temperature coordinate values correspond to the color temperature of the near-infrared light source (S507). On the other hand, when a visible light source other than the near-infrared light source is the closest (S506: No), the correction parameter generation circuit 423 determines the average values of the virtual color temperature coordinate values correspond to the color temperature of any of the visible light sources, for example, the color temperature of the closest visible light source (S508). In this way, the correction parameter generation circuit 423 estimates the color temperature of a light source on the basis of color ratios extracted from the image.

Further, the correction parameter generation circuit 423 calculates and outputs a white balance correction gain corresponding to the determined color temperature (S509). As an example, the correction parameter generation circuit 423 calculates, from the average values of the virtual color temperature coordinate values, a white balance correction gain whereby a color ratio becomes 1.

Figure 17:
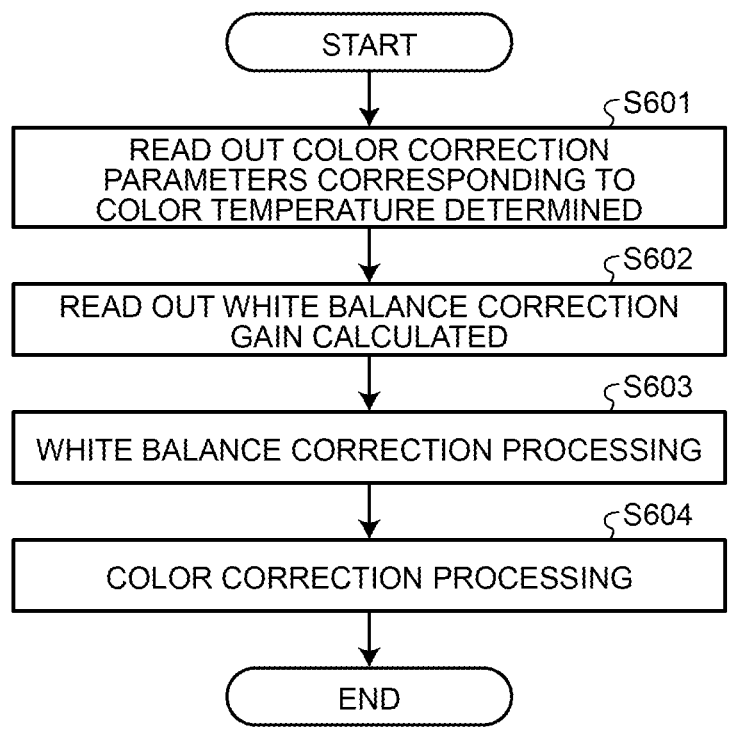
FIG. 17 is a flowchart illustrating an example of a flow of color correction processing of FIG. 7.
Figures 18, 19:
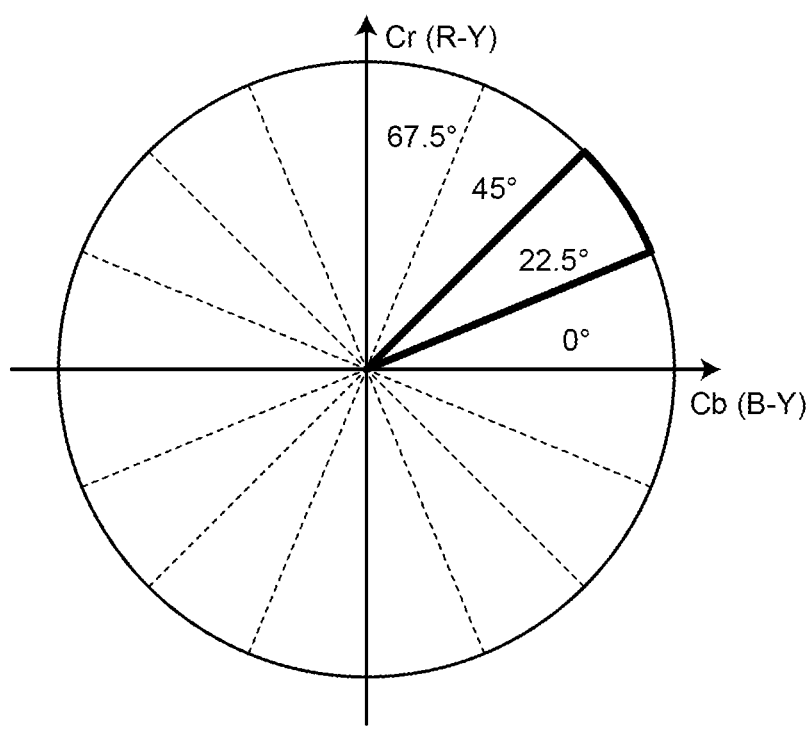
FIG. 18 is a diagram illustrating an example of a table indicating correspondence between light sources and color correction parameters used in the processing of FIG. 17.
FIG. 19 is a diagram for describing color correction parameters used in the processing of FIG. 17.

Here, the color correction processing in the video output processing according to the embodiment will now be described. FIG. 17 is a flowchart illustrating an example of a flow of the color correction processing of FIG. 7. FIG. 18 is a diagram illustrating an example of table T3 indicating correspondence between light sources and color correction parameters used in the processing of FIG. 17. In the example illustrated in FIG. 18, a light source of which the light source type is a visible light source is expressed as VIS, and a light source of which the light source type is a near-infrared light source is expressed as NIR. FIG. 19 is a diagram for describing color correction parameters used in the processing of FIG. 17.

The correction parameter generation circuit 423 reads out, from table T3, color correction parameters corresponding to the color temperature determined in color temperature estimation processing (S601). As given as an example in FIG. 18, table T3 indicates correspondence among light source types, color temperature, and color correction parameters. Table T3 includes, as color correction parameters, a chroma gain for the whole and chroma gains depending on the hue. For the chroma gain depending on the hue, as given as an example in FIG. 19, color correction parameters are stored for each region on a Cr(R—Y)—Cb (B—Y) plane. Further, the correction parameter generation circuit 423 reads out a white balance correction gain calculated in color temperature estimation processing and stored in the memory 424 (S602).

The image processing circuit 425 multiplies the pixel signal S0 by the read out white balance correction gain to generate a second video signal S2 or a third video signal S3. Here, the second video signal S2 is a video signal subjected to white balance processing for visible light. Further, the third video signal S3 is a video signal subjected to white balance processing for near-infrared light.

Further, the image processing circuit 425 generates a second video signal S2 or a third video signal S3 subjected to color correction processing using read out color correction parameters. The color correction processing is performed on a pixel signal S0 subjected to white balance processing, color matrix processing, demosaic processing, and chrominance signal generation processing.

At least one of white balance processing and color correction processing may not be performed. That is, the image processing circuit 425 generates a second video signal S2 or a third video signal S3 by subjecting the pixel signal S0 to at least one of white balance processing and color correction processing.

In this way, the video output processing according to the present embodiment estimates color temperature by using a state notification S5 of the near-infrared light source 18 and an estimation value of illuminance in the imaging range, and switches between white balance processing for near-infrared light and white balance processing for visible light in accordance with the estimated color temperature.

By this configuration, in an environment with a large amount of visible light such as daytime, white balance processing for visible light can be performed when the near-infrared light source 18 is unlit, and white balance processing for near-infrared light can be performed when the near-infrared light source 18 is lit.

For example, even in the daytime, the near-infrared light source 18 may be turned on while the vehicle 1 is traveling in a tunnel. Under such circumstances, during the period from when the vehicle 1 leaves the tunnel to when the near-infrared light source 18 is turned off, the near-infrared light source 18 may be lit in an environment with a large amount of visible light. Even in this case, by the above configuration, white balance processing for visible light can be performed.

Further, the near-infrared light source 18 can be turned on when, for example, the driver checks the surroundings by using the display 19 during low-speed traveling or when the driver obtains parking assistance and/or driving assistance. Under such circumstances, for example, while the vehicle 1 is traveling at high speed without using driving assistance or during the period from when the vehicle 1 enters a tunnel to when the near-infrared light source 18 is turned on, the near-infrared light source 18 may be unlit in an environment with a small amount of visible light. Even in this case, by the above configuration, white balance processing for visible light can be performed.

Therefore, by the video output processing according to the present embodiment, a reduction in image quality in the vehicular camera 16 having sensitivity to visible light and infrared light can be suppressed because appropriate white balance processing according to the influence of near-infrared components can be performed.

Second Embodiment

Although in the above embodiment a case where at least one of white balance processing and color correction processing is performed on the basis of the color temperature closest to calculated average values is given as an example, the present disclosure is not limited thereto. Each of white balance processing and color correction processing can also be performed using a correction gain and a color correction parameter based on interpolation processing associated with two points near average values.

Figure 20:
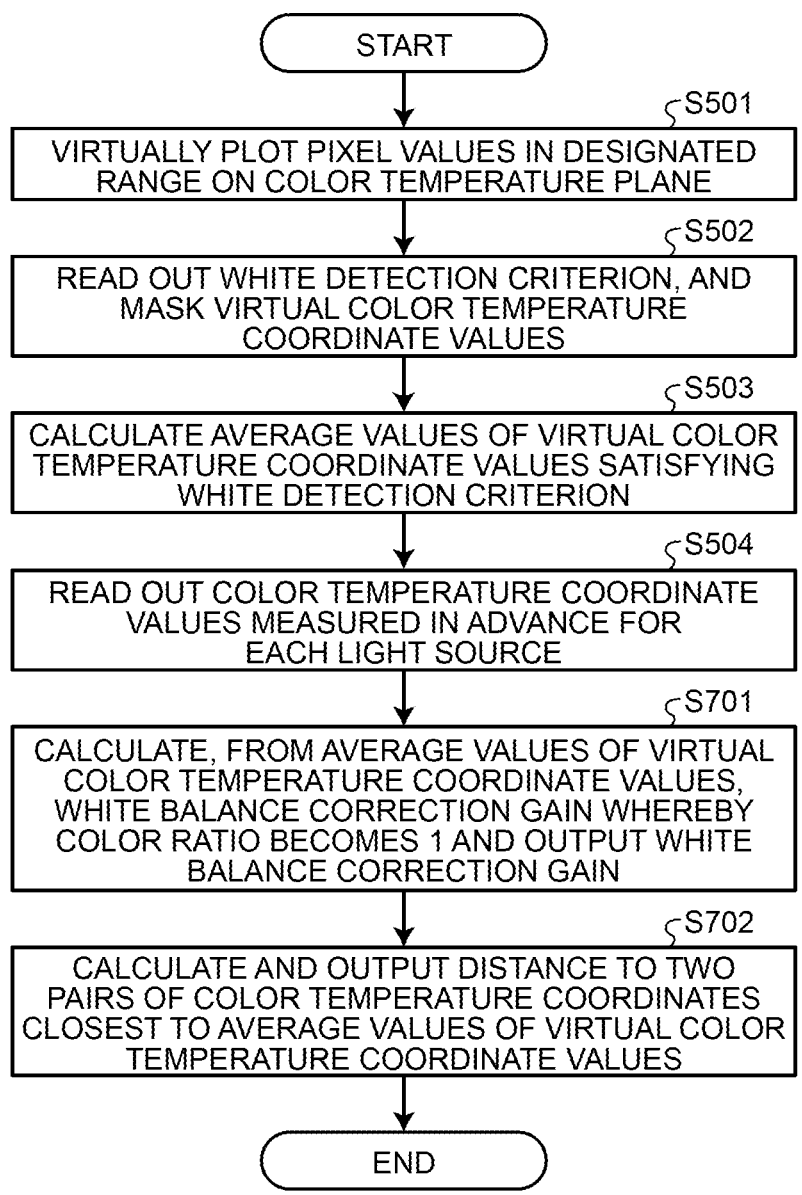
FIG. 20 is a flowchart illustrating another example of a flow of the color temperature estimation processing of FIG. 7.
Figure 21:
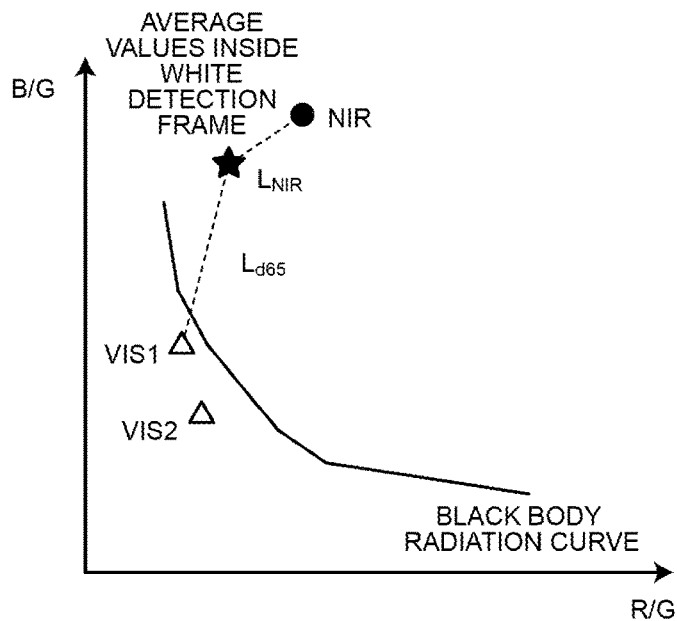
FIG. 21 is a diagram for describing color temperature estimated in the processing of FIG. 20.

FIG. 20 is a flowchart illustrating another example of a flow of the color temperature estimation processing of FIG. 7. FIG. 21 is a diagram for describing color temperature estimated in the processing of FIG. 20. In the example illustrated in FIG. 21, a light source of which the light source type is a visible light source is expressed as VIS, and a light source of which the light source type is a near-infrared light source is expressed as NIR.

Herein, differences from the color temperature estimation processing illustrated in FIG. 13 are mainly described. The correction parameter generation circuit 423 reads out color temperature coordinate values measured in advance for each light source (S504), and then calculates, from the average values of the virtual color temperature coordinate values, a white balance correction gain whereby a color ratio becomes 1 and outputs the white balance correction gain (S701).

Further, the correction parameter generation circuit 423 calculates and outputs distances LNIR and LVIS1 to the top two pairs of color temperature coordinates closest to the average values of the virtual color temperature coordinate values (S702). FIG. 21 gives, as an example, the color temperatures of VIS1 and NIR as the top two color temperatures closest to the average values of the virtual color temperature coordinate values. In this case, the correction parameter generation circuit 423 calculates a distance LVIS1 from the average values of the virtual color temperature coordinate values (the star sign in FIG. 16) to VIS1 in the color coordinate system and a distance LNIR from the average values of the virtual color temperature coordinate values to NIR in the color coordinate system.

Figure 22:
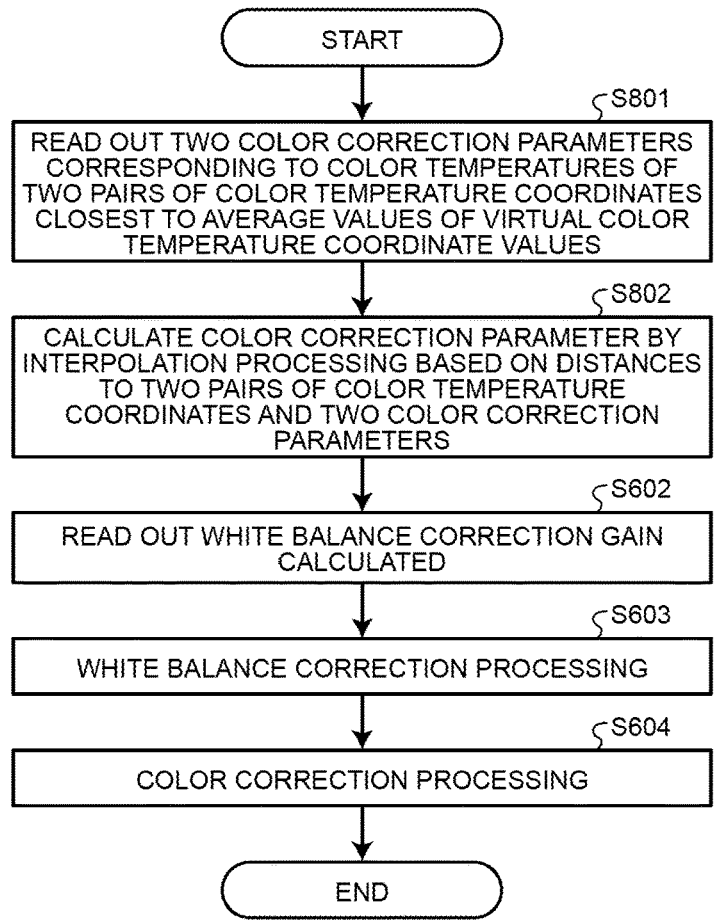
FIG. 22 is a flowchart illustrating another example of a flow of the color correction processing of FIG. 7.

FIG. 22 is a flowchart illustrating another example of a flow of the color correction processing of FIG. 7. Herein, differences from the color temperature estimation processing illustrated in FIG. 17 are mainly described.

The correction parameter generation circuit 423 read outs, from table T3, two color correction parameters corresponding to the color temperatures of the top two pairs of color temperature coordinates (in FIG. 21, VIS1 and NIR) closest to the average values of the virtual color temperature coordinate values (S801).

Further, the correction parameter generation circuit 423 performs interpolation processing based on the distances LNIR and LVIS1 to the two pairs of color temperature coordinates and the read out two color correction parameters, and thereby calculates a color correction parameter for the average values of the virtual color temperature coordinate values. In this way, when the color temperature estimation value is located between near-infrared light and visible light, the correction parameter generation circuit 423 calculates a color correction parameter for the estimation value by interpolation processing (S802). After that, a white balance correction gain is read out by the correction parameter generation circuit 423 (S602), and at least one of white balance correction processing (S603) and color correction processing (S604) is performed by the image processing circuit 425.

The technique regarding the video output processing according to the present disclosure is not limited to the vehicular camera 16, and can also be applied to a camera used in an environment where the amounts of visible light and near-infrared light change, such as a monitoring camera.

A program to be executed by each device (the vehicle 1 or the vehicular camera 16) of the present embodiment is provided by being incorporated in advance in, for example, a ROM or the like.

The program to be executed by each device (the vehicle 1 or the vehicular camera 16) of the present embodiment may be provided by being recorded on a computer-readable recording medium such as a CD-ROM, an FD, a CD-R, or a DVD as a file in an installable format or an executable format.

Further, the program to be executed by each device (the vehicle 1 or the vehicular camera 16) of the present embodiment may be stored on a computer connected to a network such as the Internet, and may be configured to be provided by download via the network. Further, the program to be executed by each device (the vehicle 1 or the vehicular camera 16) may be configured to be provided or distributed via a network such as the Internet.

According to at least one of the embodiments described above, a reduction in image quality in a vehicular camera having sensitivity to visible light and infrared light can be suppressed.

According to the present disclosure, a reduction in image quality in a vehicular camera having sensitivity to visible light and infrared light can be suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Supplementary Notes

The following techniques are disclosed by the above description of embodiments.

Technique 1

A vehicle including:
a first wheel;
a second wheel;
a vehicle body coupled to the first wheel and the second wheel and cable of moving by means of the first wheel and the second wheel;
a near-infrared light source attached to the vehicle body and configured to irradiate at least part of surroundings of the vehicle body with near-infrared light;
a camera attached to the vehicle body and configured to image the at least part of the surroundings of the vehicle body and output a first video imaged;
an illuminance sensor attached to the vehicle body and configured to detect an illuminance of the at least part of the surroundings of the vehicle body; and
an output circuit disposed inside the vehicle body, wherein
the output circuit is configured to output a second video in which at least part of the first video is subjected to a first correction processing, when the near-infrared light source has a first light emission intensity, and
the output circuit is configured to output a third video in which at least part of the first video is subjected to a second correction processing different from the first correction processing, when the near-infrared light source has a second light emission intensity larger than the first light emission intensity and the illuminance is smaller than a predetermined value.

Technique 2

The vehicle according to Technique 1, wherein
the output circuit is configured to output the second video in which the at least part of the first video is subjected to the first correction processing, when the near-infrared light source has the second light emission intensity and the illuminance is larger than the predetermined value.

Technique 3

The vehicle according to Technique 1 or 2, wherein
the first light emission intensity of the near-infrared light source is 0 (zero).

Technique 4

The vehicle according to Technique 3, wherein
the first light emission intensity of the near-infrared light source is a light emission intensity when electric power is not supplied to the near-infrared light source.

Technique 5

The vehicle according to any of Techniques 1 to 4, wherein
the camera includes:
a lens barrel including at least one lens;
a circuit board having a first surface and a second surface opposite to the first surface;
an imaging element disposed on the first surface of the circuit board, disposed on an optical axis of the at least one lens, and having spectral sensitivity to visible light to near-infrared light; and
a housing that houses at least the circuit board.

Technique 6

The vehicle according to Technique 5, wherein
the imaging element of the camera serves also as the illuminance sensor.

Technique 7

The vehicle according to any of Techniques 1 to 6, wherein
the output circuit includes a screen configured to display a video.

Technique 8

The vehicle according to any of Techniques 1 to 7, wherein
the first correction processing is white balance correction processing for visible light, and
the second correction processing is white balance correction processing for near-infrared light.

Technique 9

The vehicle according to Technique 8, wherein
a detection frame in a color coordinate system, used for the white balance correction processing for visible light as the first correction processing is set as a first detection frame,
a detection frame in the color coordinate system, used for the white balance correction processing for near-infrared light as the second correction processing is set as a second detection frame,
the second detection frame is larger than the first detection frame in the color coordinate system, and
the second detection frame includes color coordinates corresponding to light emitted by the near-infrared light source in the color coordinate system.

Technique 10

The vehicle according to any of Techniques 1 to 9, including
a control circuit, wherein
the control circuit is configured to execute at least the first correction processing and the second correction processing.

Technique 11

A vehicular camera capable of being mounted on a vehicle, the vehicle including:
a first wheel;
a second wheel;
a vehicle body coupled to the first wheel and the second wheel and capable of moving by means of the first wheel and the second wheel; and
a near-infrared light source attached to the vehicle body and configured to irradiate at least part of surroundings of the vehicle body with near-infrared light, the vehicular camera being configured to image the at least part of the surroundings of the vehicle body and be capable of outputting a first video imaged,
the vehicular camera including:
an illuminance sensor attached to the vehicle body and configured to be capable of detecting an illuminance of the at least part of the surroundings of the vehicle body; and
an output circuit configured to be capable of performing outputting into inside the vehicle body, wherein
the output circuit is configured to output a second video in which at least part of the first video is subjected to a first correction processing, when the near-infrared light source has a first light emission intensity, and
the output circuit is configured to output a third video in which at least part of the first video is subjected to a second correction processing different from the first correction processing, when the near-infrared light source has a second light emission intensity larger than the first light emission intensity and the illuminance is smaller than a predetermined value.

Technique 12

The vehicular camera according to Technique 11, wherein the output circuit is configured to output the second video in which at least part of the first video is subjected to the first correction processing, when the near-infrared light source has the second light emission intensity and the illuminance is larger than the predetermined value.

Technique 13

The vehicular camera according to Technique 11 or 12, wherein
the first light emission intensity of the near-infrared light source is 0 (zero).

Technique 14

The vehicular camera according to Technique 13, wherein the first light emission intensity of the near-infrared light source is a light emission intensity when electric power is not supplied to the near-infrared light source.

Technique 15

The vehicular camera according to any of Techniques 11 to 14, further including:
a lens barrel including at least one lens;
a circuit board having a first surface and a second surface opposite to the first surface;
an imaging element disposed on the first surface of the circuit board, disposed on an optical axis of the at least one lens, and having spectral sensitivity to visible light to near-infrared light; and
a housing that houses at least the circuit board.

Technique 16

The vehicular camera according to Technique 15, wherein the imaging element serves also as the illuminance sensor.

Technique 17

The vehicular camera according to any of Techniques 11 to 16, wherein the output circuit is capable of outputting a video to a screen of a display device mounted on the vehicle body.

Technique 18

The vehicular camera according to any one of Techniques 11 to 17, wherein
the first correction processing is white balance correction processing for visible light, and
the second correction processing is white balance correction processing for near-infrared light.

Technique 19

The vehicular camera according to Technique 18, wherein a detection frame in a color coordinate system, used for the white balance correction processing for visible light as the first correction processing is set as a first detection frame,
a detection frame in the color coordinate system, used for the white balance correction processing for near-infrared light as the second correction processing is set as a second detection frame,
the second detection frame is larger than the first detection frame in the color coordinate system, and
the second detection frame includes color coordinates corresponding to light emitted by the near-infrared light source in the color coordinate system.

Technique 20

The vehicular camera according to any one of Techniques 11 to 19, including
a control circuit, wherein
the control circuit is configured to execute at least the first correction processing and the second correction processing.

Technique 21

A video output method capable of being executed in a vehicle, the vehicle including:
a first wheel;
a second wheel;
a vehicle body coupled to the first wheel and the second wheel and capable of moving by means of the first wheel and the second wheel;
a near-infrared light source attached to the vehicle body and configured to irradiate at least part of surroundings of the vehicle body with near-infrared light;
a camera attached to the vehicle body and configured to image the at least part of the surroundings of the vehicle body and output a first video imaged;
an illuminance sensor attached to the vehicle body and configured to detect an illuminance of the at least part of the surroundings of the vehicle body; and
an output circuit disposed inside the vehicle body,
the video output method including:
by the output circuit, outputting a second video in which at least part of the first video is subjected to a first correction processing, when the near-infrared light source has a first light emission intensity, and
by the output circuit, outputting a third video in which at least part of the first video is subjected to a second correction processing different from the first correction processing, when the near-infrared light source has a second light emission intensity larger than the first light emission intensity and the illuminance is smaller than a predetermined value.

Technique 22

The video output method according to Technique 21, further including
by the output circuit, outputting the second video in which at least part of the first video is subjected to the first correction processing, when the near-infrared light source has the second light emission intensity and the illuminance is larger than the predetermined value.

Technique 23

The video output method according to Technique 21 or 22, wherein
the first light emission intensity of the near-infrared light source is 0 (zero).

Technique 24

The video output method according to Technique 23, wherein
the first light emission intensity of the near-infrared light source is a light emission intensity when electric power is not supplied to the near-infrared light source.

Technique 25

The video output method according to any of Techniques 21 to 24, wherein
the camera includes:
  a lens barrel including at least one lens;
  a circuit board having a first surface and a second surface opposite to the first surface;
  an imaging element disposed on the first surface of the circuit board, disposed on an optical axis of the at least one lens, and having spectral sensitivity to visible light to near-infrared light; and
  a housing that houses at least the circuit board.

Technique 26

The video output method according to Technique 25, wherein
the imaging element of the camera serves also as the illuminance sensor.

Technique 27

The video output method according to any of Techniques 21 to 26, wherein
the output circuit includes a screen configured to display a video.

Technique 28

The video output method according to any of Techniques 21 to 27, wherein
the first correction processing is white balance correction processing for visible light, and
the second correction processing is white balance correction processing for near-infrared light.

Technique 29

The video output method according to Technique 28, wherein a detection frame in a color coordinate system, used for the white balance correction processing for visible light as the first correction processing is set as a first detection frame,
a detection frame in the color coordinate system, used for the white balance correction processing for near-infrared light as the second correction processing is set as a second detection frame,
the second detection frame is larger than the first detection frame in the color coordinate system, and
the second detection frame includes color coordinates corresponding to light emitted by the near-infrared light source in the color coordinate system.

Technique 30

The video output method according to any of Techniques 21 to 29, wherein
the vehicle includes a control circuit, and
the video output method further includes
by the control circuit, executing at least the first correction processing and the second correction processing.

Technique 31

A program for causing a computer to execute the video output method according to any of Techniques 21 to 30.

Technique 32

A recording medium (computer program product) on which a program to be executed by a computer, the program being according to Technique 31, is recorded.

What is claimed is:
1. A vehicular camera capable of being mounted on a vehicle, the vehicle including:
  a first wheel;
  a second wheel;
  a vehicle body coupled to the first wheel and the second wheel, wherein the vehicle body, in operation, moves by way of the first wheel and the second wheel; and
  a near-infrared light source attached to the vehicle body, wherein the near-infrared light source, in operation, irradiates at least part of surroundings of the vehicle body with near-infrared light,
wherein the vehicular camera, in operation, images the at least part of the surroundings of the vehicle body and outputs a first video imaged,
wherein the vehicular camera includes:
  an illuminance sensor attached to the vehicle body, wherein the illuminance sensor, in operation, detects an illuminance of the at least part of the surroundings of the vehicle body; and
  an output circuit that, in operation, performs outputting into inside the vehicle body,
wherein the output circuit, in operation, outputs a second video in which at least part of the first video is subjected to a first correction processing, when the near-infrared light source has a first light emission intensity,
wherein the output circuit, in operation, outputs a third video in which at least part of the first video is subjected to a second correction processing different from the first correction processing, when the near-infrared light source has a second light emission intensity larger than the first light emission intensity and the illuminance is smaller than a predetermined value, wherein the first correction processing is white balance correction processing for visible light, wherein the second correction processing is white balance correction processing for near-infrared light, wherein a detection frame in a color coordinate system, used for the white balance correction processing for visible light as the first correction processing is set as a first detection frame, wherein a detection frame in the color coordinate system, used for the white balance correction processing for near-infrared light as the second correction processing is set as a second detection frame, wherein the second detection frame is larger than the first detection frame in the color coordinate system, and wherein the second detection frame includes color coordinates corresponding to light emitted by the near-infrared light source in the color coordinate system.

2. The vehicular camera according to claim 1, wherein the output circuit, in operation, outputs the second video in which at least part of the first video is subjected to the first correction processing, when the near-infrared light source has the second light emission intensity and the illuminance is larger than the predetermined value.

3. The vehicular camera according to claim 1, wherein the first light emission intensity of the near-infrared light source is 0 (zero).

4. The vehicular camera according to claim 3, wherein the first light emission intensity of the near-infrared light source is a light emission intensity when electric power is not supplied to the near-infrared light source.

5. The vehicular camera according to claim 1, further comprising:
a lens barrel including at least one lens;
a circuit board having a first surface and a second surface opposite to the first surface;
an imaging element disposed on the first surface of the circuit board, disposed on an optical axis of the at least one lens, and having spectral sensitivity to visible light to near-infrared light; and
a housing that houses at least the circuit board.

6. The vehicular camera according to claim 5, wherein the imaging element serves also as the illuminance sensor.

7. The vehicular camera according to claim 1, wherein the output circuit, in operation, outputs a video to a screen of a display device mounted on the vehicle body.

8. The vehicular camera according to claim 1, comprising a control circuit, wherein the control circuit, in operation, performs at least the first correction processing and the second correction processing.

9. A video output method performed in a vehicle, the vehicle including:
a first wheel;
a second wheel;
a vehicle body coupled to the first wheel and the second wheel, wherein the vehicle body, in operation, moves by way of the first wheel and the second wheel;
a near-infrared light source attached to the vehicle body, wherein the near-infrared light source, in operation, irradiates at least part of surroundings of the vehicle body with near-infrared light;
a camera attached to the vehicle body, wherein the camera, in operation, images the at least part of the surroundings of the vehicle body and output a first video imaged;
an illuminance sensor attached to the vehicle body, wherein the illuminance sensor, in operation, detects an illuminance of the at least part of the surroundings of the vehicle body; and
an output circuit disposed inside the vehicle body,
the video output method comprising:
by the output circuit, outputting a second video in which at least part of the first video is subjected to a first correction processing, when the near-infrared light source has a first light emission intensity, and
by the output circuit, outputting a third video in which at least part of the first video is subjected to a second correction processing different from the first correction processing, when the near-infrared light source has a second light emission intensity larger than the first light emission intensity and the illuminance is smaller than a predetermined value, wherein the first correction processing is white balance correction processing for visible light, and wherein the second correction processing is white balance correction processing for near-infrared light, wherein a detection frame in a color coordinate system, used for the white balance correction processing for visible light as the first correction processing is set as a first detection frame, wherein a detection frame in the color coordinate system, used for the white balance correction processing for near-infrared light as the second correction processing is set as a second detection frame, wherein the second detection frame is larger than the first detection frame in the color coordinate system, and wherein the second detection frame includes color coordinates corresponding to light emitted by the near-infrared light source in the color coordinate system.

10. The video output method according to claim 9, further comprising
by the output circuit, outputting the second video in which at least part of the first video is subjected to the first correction processing, when the near-infrared light source has the second light emission intensity and the illuminance is larger than the predetermined value.

11. The video output method according to claim 9, wherein
the first light emission intensity of the near-infrared light source is 0 (zero).

12. The video output method according to claim 11, wherein
the first light emission intensity of the near-infrared light source is a light emission intensity when electric power is not supplied to the near-infrared light source.

13. The video output method according to claim 9, wherein
the camera includes:
a lens barrel including at least one lens;
a circuit board having a first surface and a second surface opposite to the first surface;
an imaging element disposed on the first surface of the circuit board, disposed on an optical axis of the at least one lens, and having spectral sensitivity to visible light to near-infrared light; and
a housing that houses at least the circuit board.

14. The video output method according to claim 13, wherein
the imaging element of the camera serves also as the illuminance sensor.

15. The video output method according to claim 9, wherein the output circuit includes a screen that, in operation, displays a video.

16. The video output method according to claim 9, wherein
the vehicle includes a control circuit, and
the video output method further comprises:
by the control circuit, performing at least the first correction processing and the second correction processing.

* * * * *